United States Patent
Morioka et al.

(10) Patent No.: US 10,743,349 B2
(45) Date of Patent: *Aug. 11, 2020

(54) WIRELESS COMMUNICATION DEVICE AND WIRELESS COMMUNICATION METHOD

(71) Applicant: Sony Corporation, Tokyo (JP)

(72) Inventors: Yuichi Morioka, Kanagawa (JP); Takeshi Itagaki, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/297,724

(22) Filed: Mar. 11, 2019

(65) Prior Publication Data

US 2019/0223218 A1 Jul. 18, 2019

Related U.S. Application Data

(63) Continuation of application No. 15/570,402, filed as application No. PCT/JP2017/011446 on Mar. 22, 2017, now Pat. No. 10,292,183.

(30) Foreign Application Priority Data

Jun. 3, 2016 (JP) ................... 2016-112042

(51) Int. Cl.
*H04W 74/08* (2009.01)
*H04W 72/08* (2009.01)
(Continued)

(52) U.S. Cl.
CPC ..... *H04W 74/0816* (2013.01); *H04W 72/085* (2013.01); *H04W 84/12* (2013.01); *H04W 92/10* (2013.01)

(58) Field of Classification Search
CPC .......... H04W 74/0816; H04W 72/085; H04W 92/10
See application file for complete search history.

(56) References Cited

U.S. PATENT DOCUMENTS

| 2005/0041616 A1 | 2/2005 | Ginzburg et al. |
| 2008/0144500 A1* | 6/2008 | Chen ............... H04L 43/16 370/235 |

(Continued)

FOREIGN PATENT DOCUMENTS

| GB | 2414637 A | 11/2005 |
| JP | 2009-533976 A | 9/2009 |

(Continued)

OTHER PUBLICATIONS

IEEE Std 802.11 ™-2007, IEEE Standard for Information technology-Telecommunications and information exchange between systems—Local and metropolitan area networks—Specific requirements, Part 11: Wireless LAN Medium Access Control (MAC) and Physical Layer (PHY) Specifications, IEEE Computer Society, Jun. 12, 2007, (1231 pages).

(Continued)

*Primary Examiner* — Charles C Jiang
*Assistant Examiner* — Ryan C Kavleski
(74) *Attorney, Agent, or Firm* — Xsensus LLP

(57) ABSTRACT

An electronic device that determines a first parameter corresponding to a length or duration of data to be transmitted by the electronic device; determines whether the first parameter exceeds a predetermined threshold value; controls a wireless interface of the electronic device to transmit a request to send the data when the parameter exceeds the predetermined threshold value; acquires a second parameter related to detection sensitivity or transmission power; and determines, when the first parameter does not exceed the predetermined threshold value, whether to transmit the (Continued)

request to send the data prior to transmitting the data based on the second parameter.

8 Claims, 21 Drawing Sheets

(51) Int. Cl.
*H04W 84/12* (2009.01)
*H04W 92/10* (2009.01)

(56) References Cited

U.S. PATENT DOCUMENTS

| | | | |
|---|---|---|---|
| 2009/0175170 A1 | 7/2009 | Langguth et al. | |
| 2012/0252509 A1* | 10/2012 | Wen | H04B 7/2606 455/500 |
| 2016/0014807 A1* | 1/2016 | Ghosh | H04L 5/0058 370/329 |
| 2016/0128059 A1 | 5/2016 | Hsu et al. | |
| 2016/0156437 A1* | 6/2016 | Li | H04W 74/0808 370/329 |
| 2016/0286483 A1 | 9/2016 | Bergstrom et al. | |
| 2017/0187848 A1* | 6/2017 | Itagaki | H04L 1/0079 |

FOREIGN PATENT DOCUMENTS

| | | |
|---|---|---|
| WO | 01/048952 A1 | 7/2001 |
| WO | 2016/044725 A2 | 3/2016 |

OTHER PUBLICATIONS

Tetsuya Shigeyasu, et al., "Throughput Improvement of IEEE802.11 DCF with Adaptive RTS/CTS Control on the Basis of Existence of Hidden Terminals", 2011 International Conference on Complex, Intelligent, and Software Intensive Systems, 2011 IEEE XP032036516 Jun. 30, 2011 (pp. 46-52).

Ye Chen, et al., "An RTS-on-demand Mechanism to Overcome Self-interference in an 802.11 System", 2007 Military Communications Conference, MILCOM 2007, IEEE, XP031232960, Oct. 29, 2007, (7 pages).

International Search Report dated Jul. 6, 2017 in PCT/JP2017/011446 filed Mar. 22, 2017.

Japanese Notification of Reason for Refusal dated Jan. 14, 2020 in Japanese Appiication No. 2016-112042.

* cited by examiner

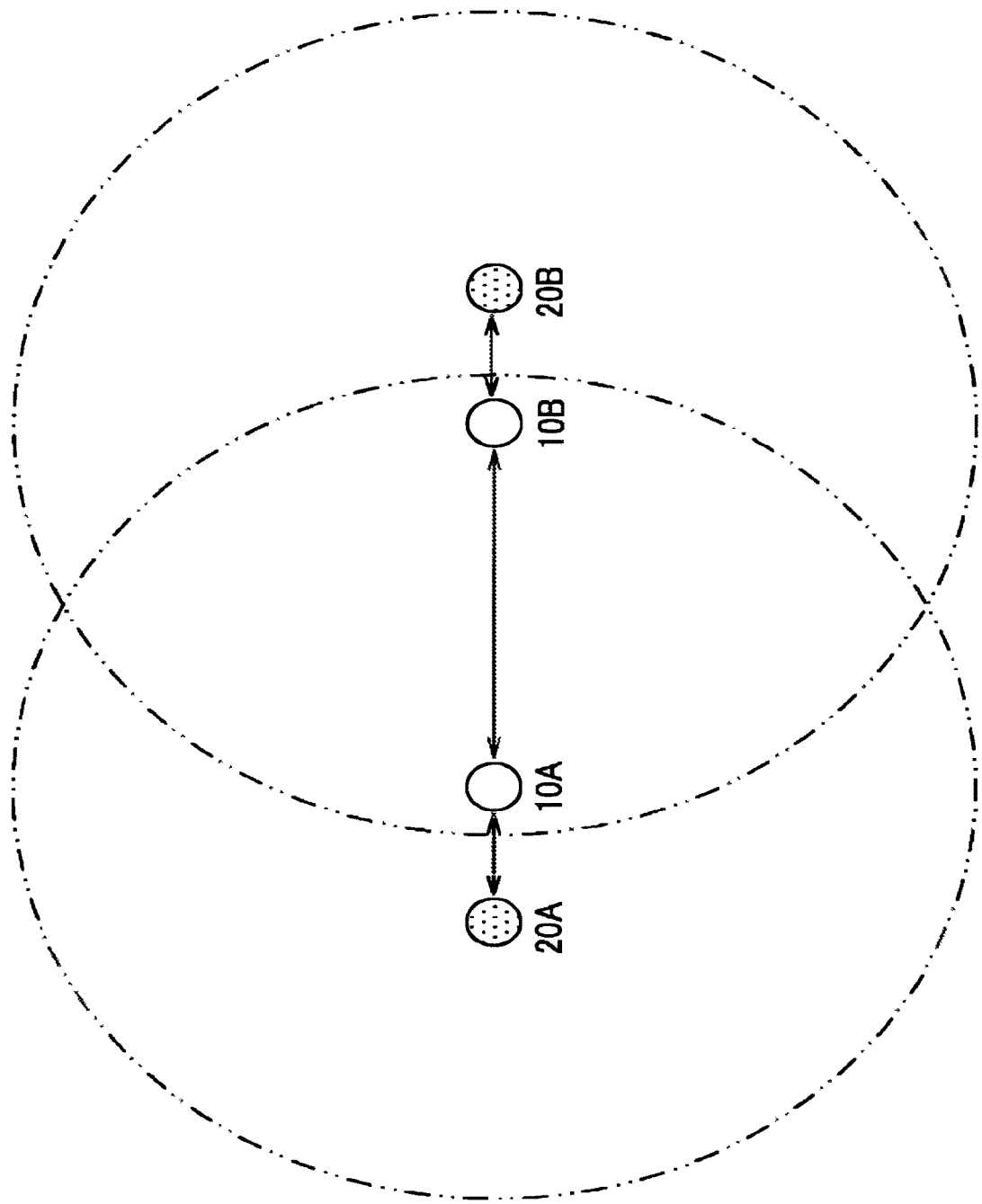

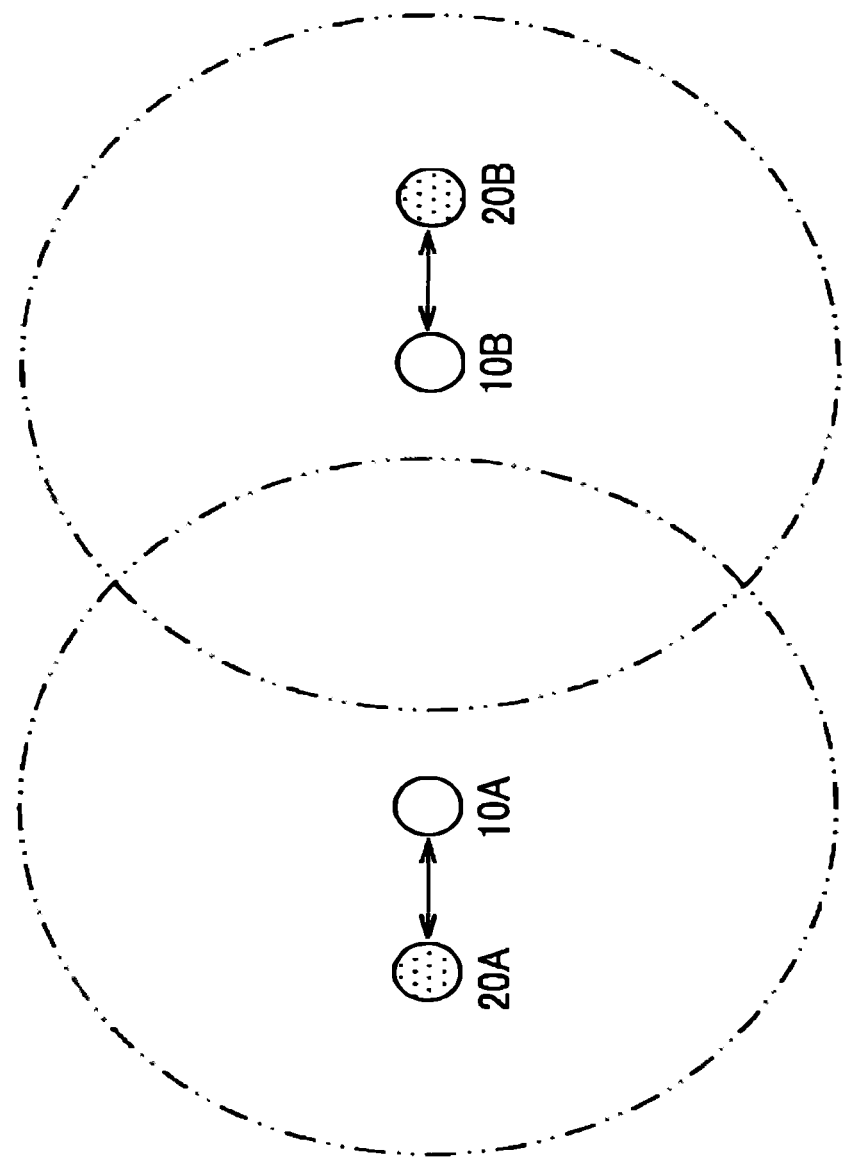
[Fig. 2]

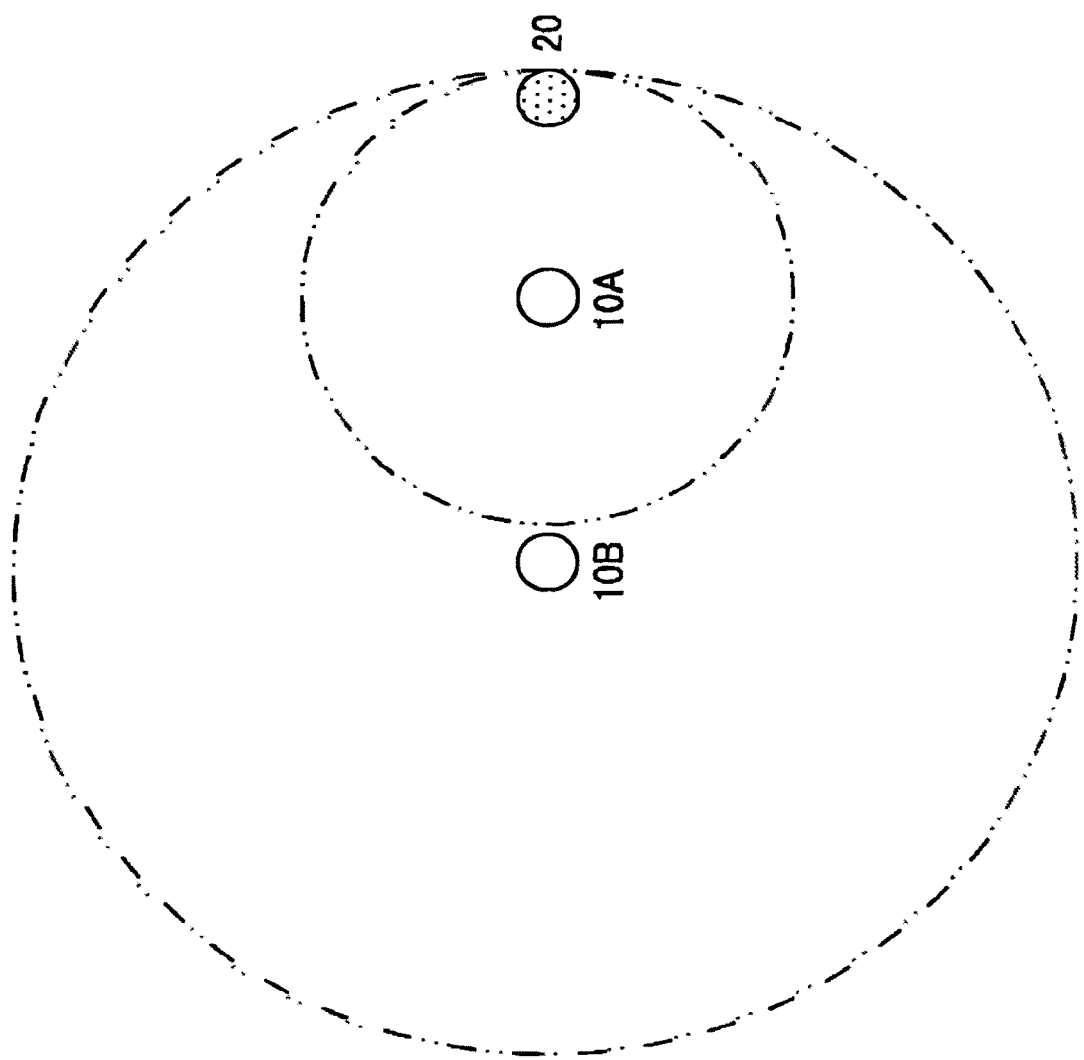
[Fig. 3]

[Fig. 4]
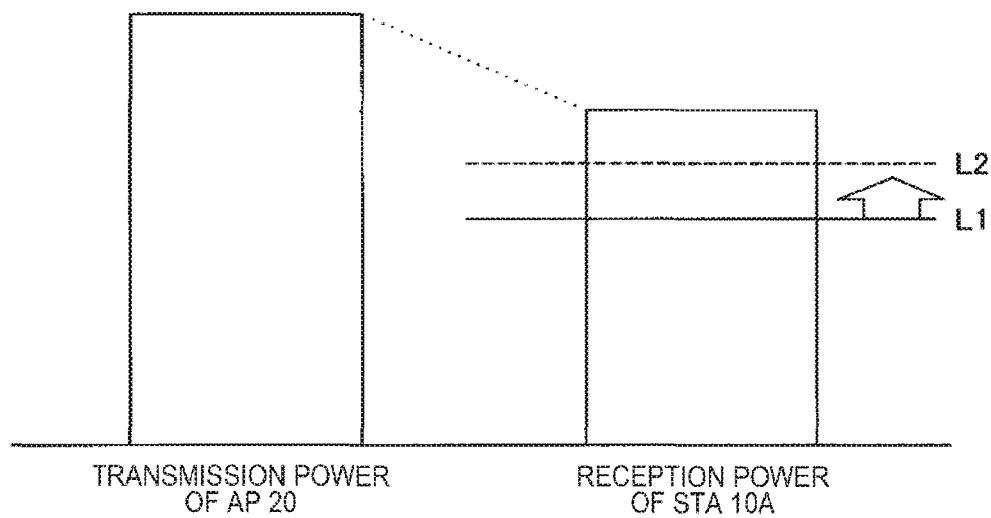
[Fig. 5]
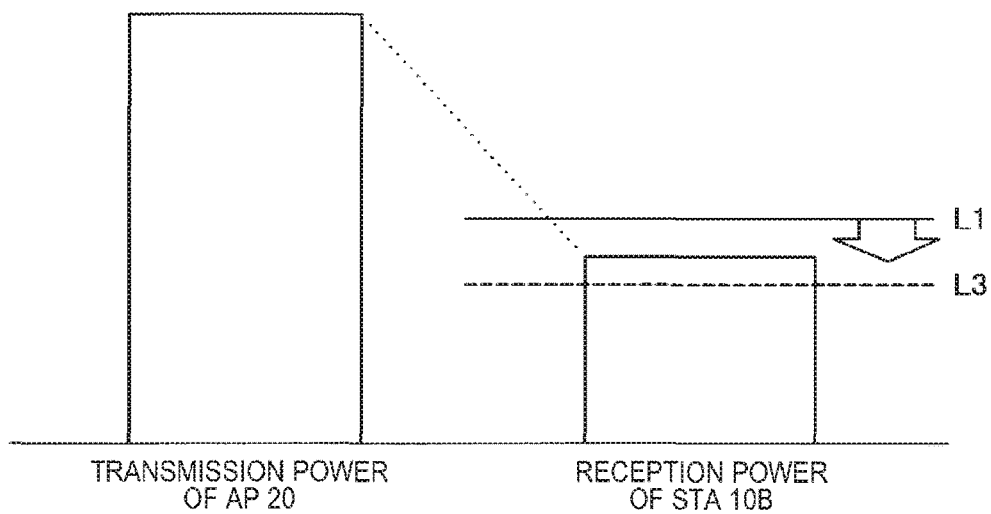

[Fig. 6]
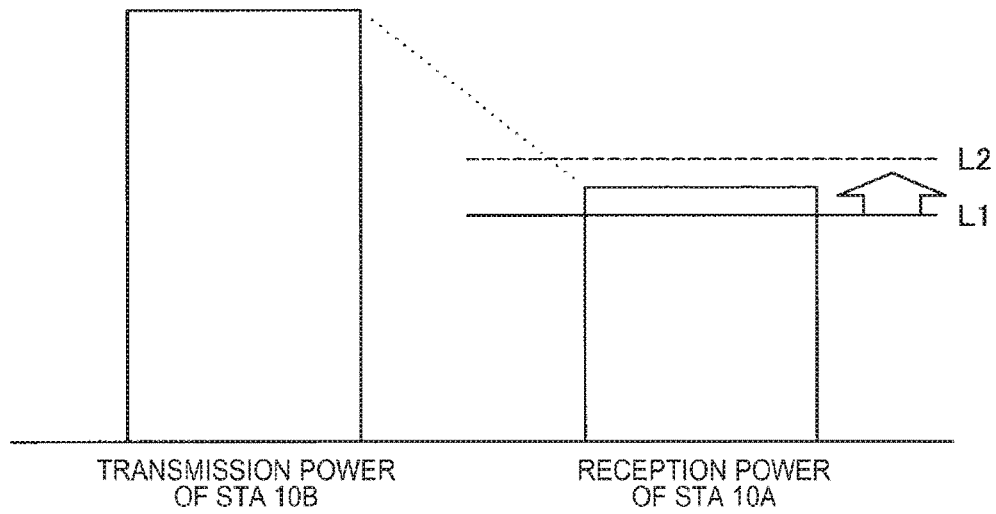

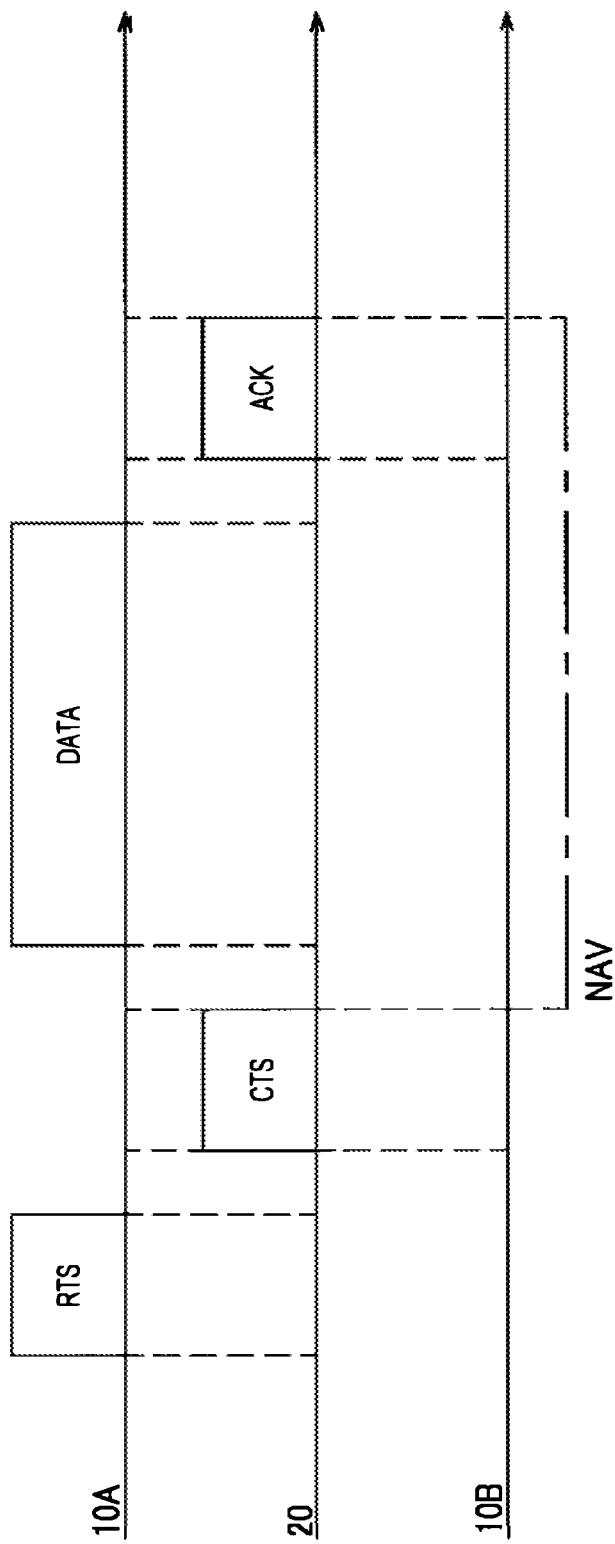

[Fig. 8]
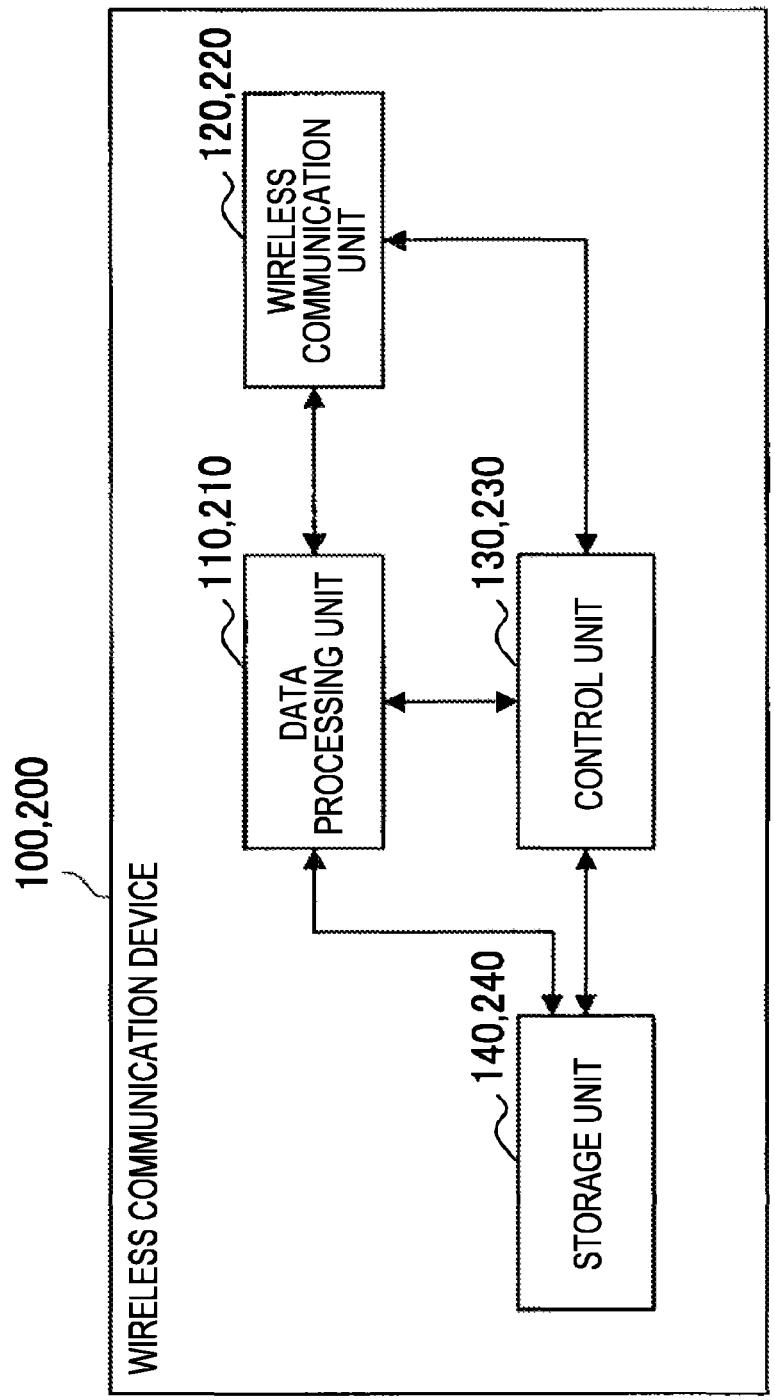

[Fig. 9]
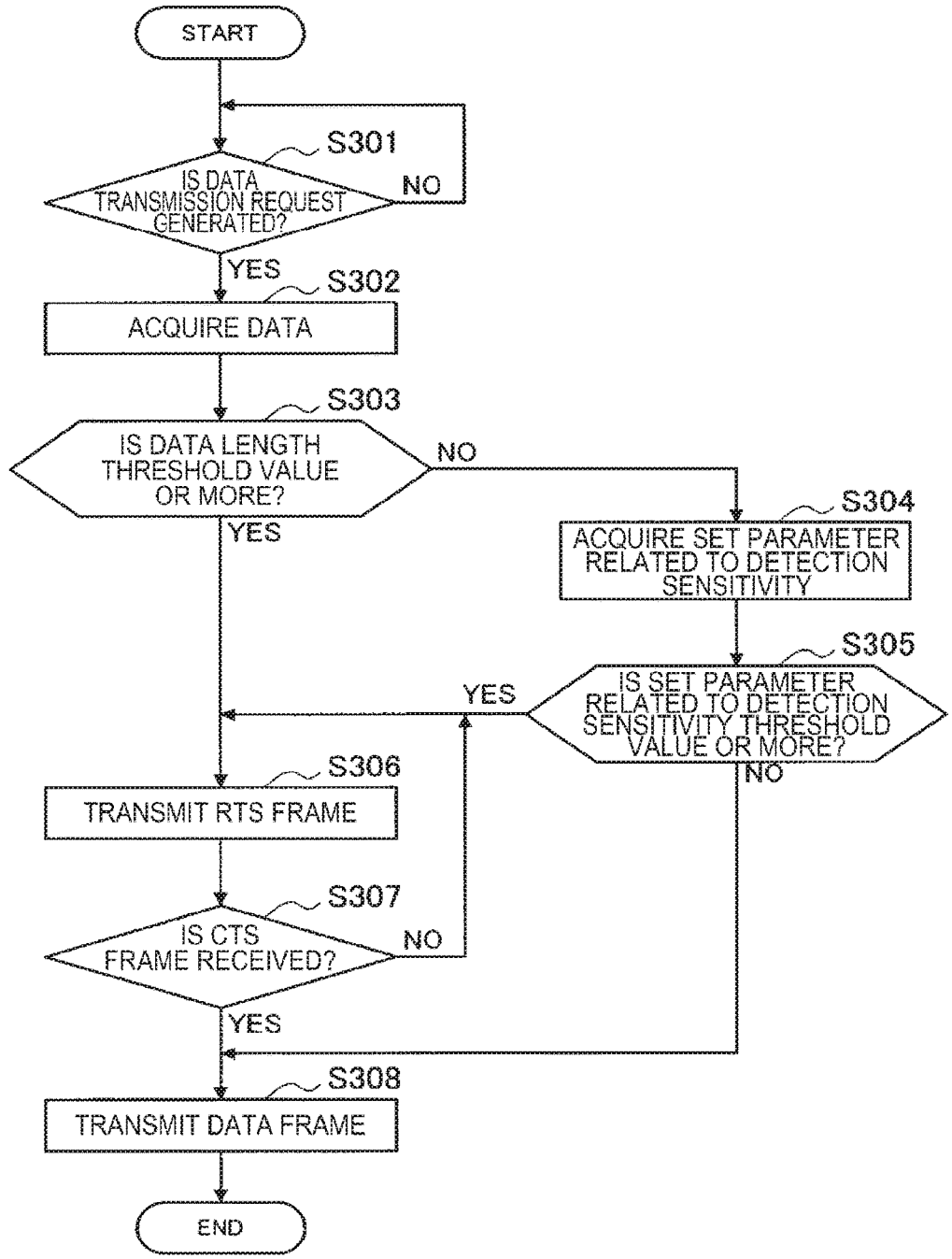

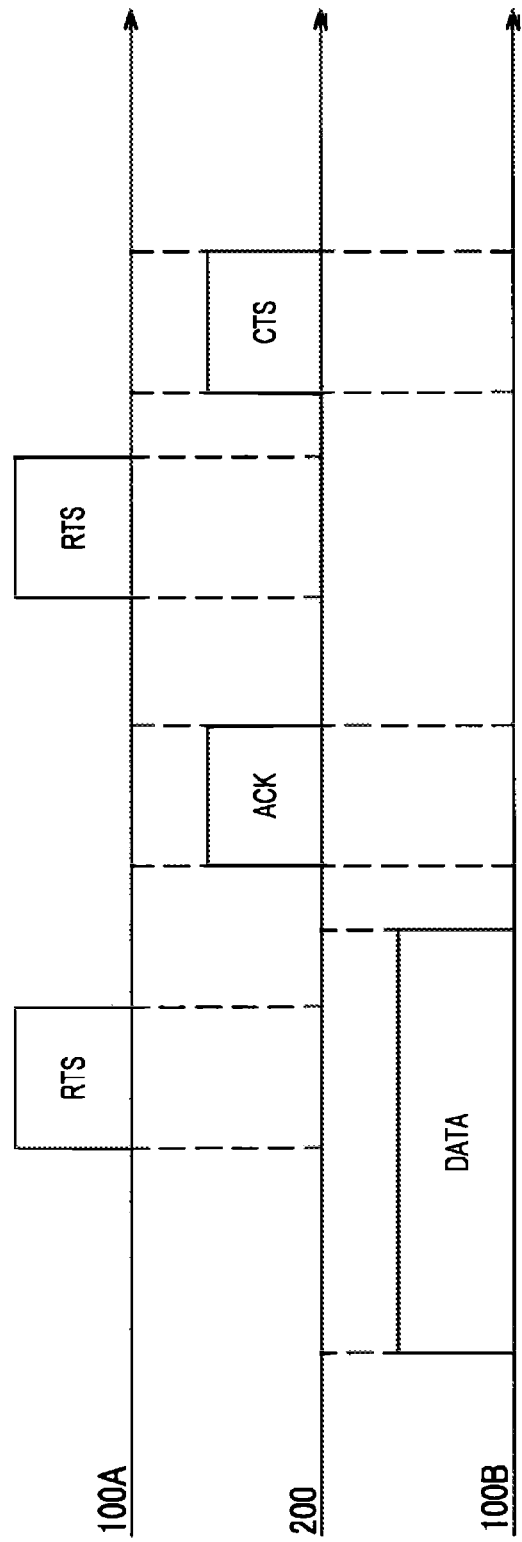

[Fig. 11]
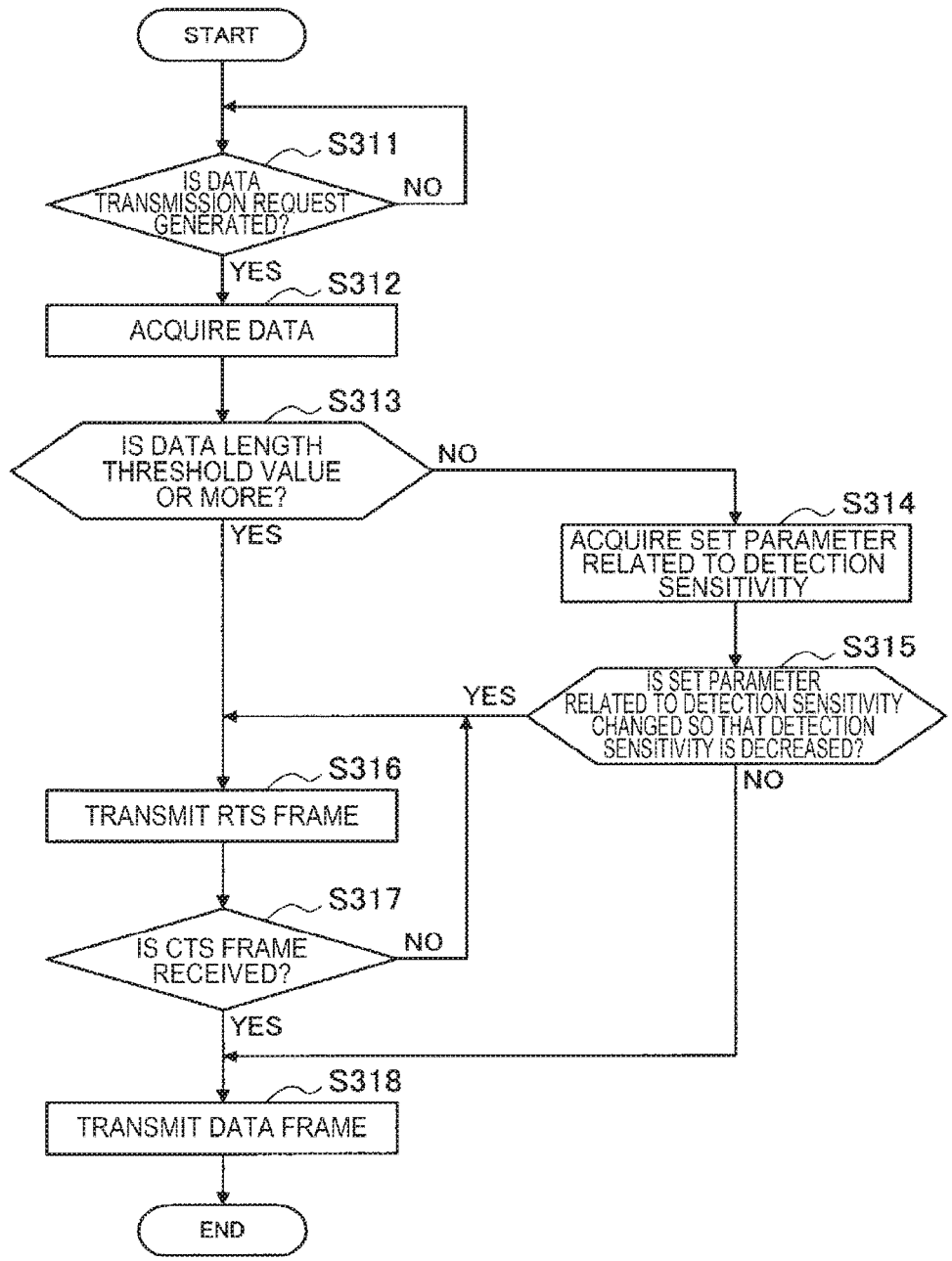

[Fig. 12]
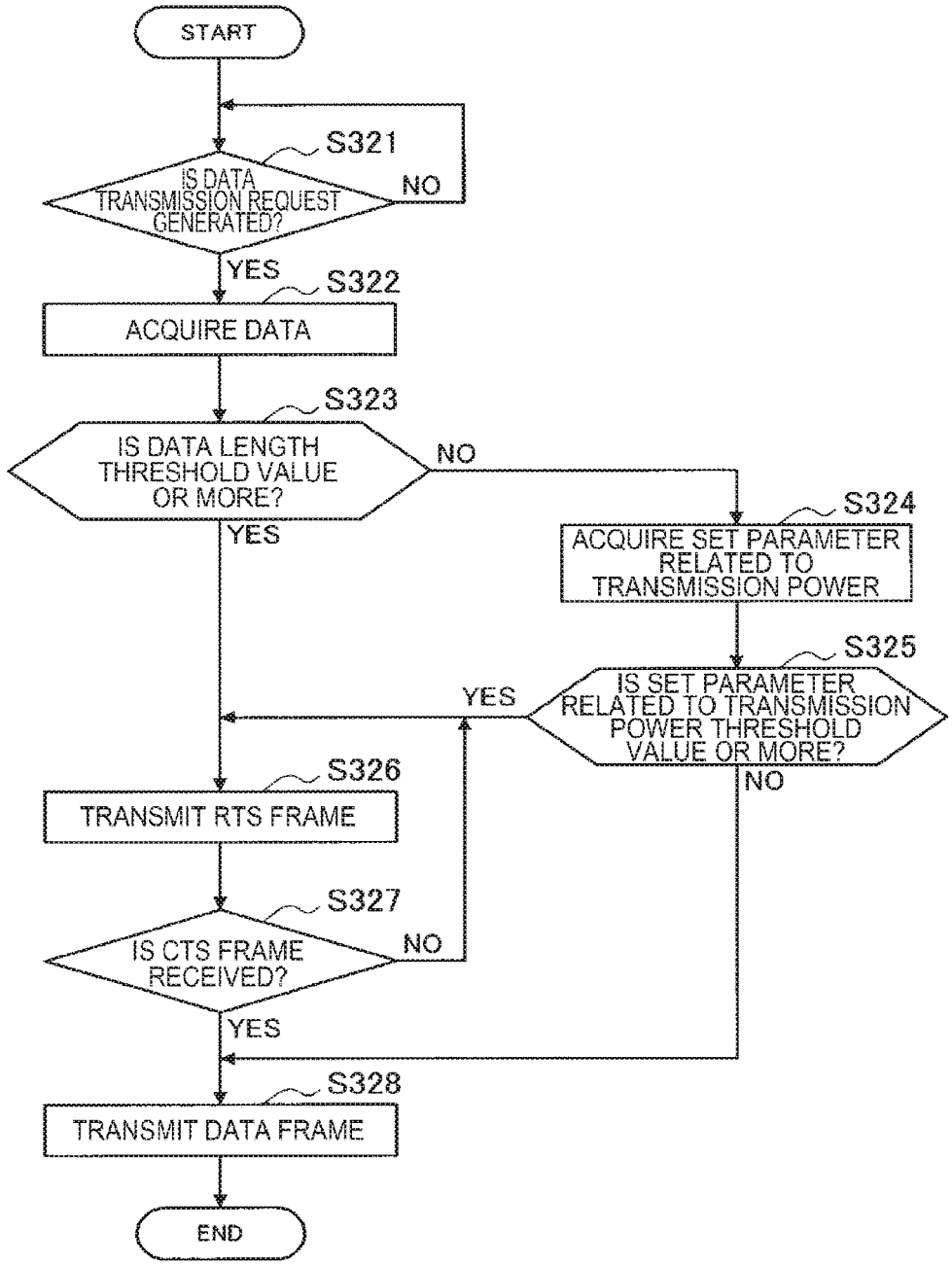

[Fig. 13]
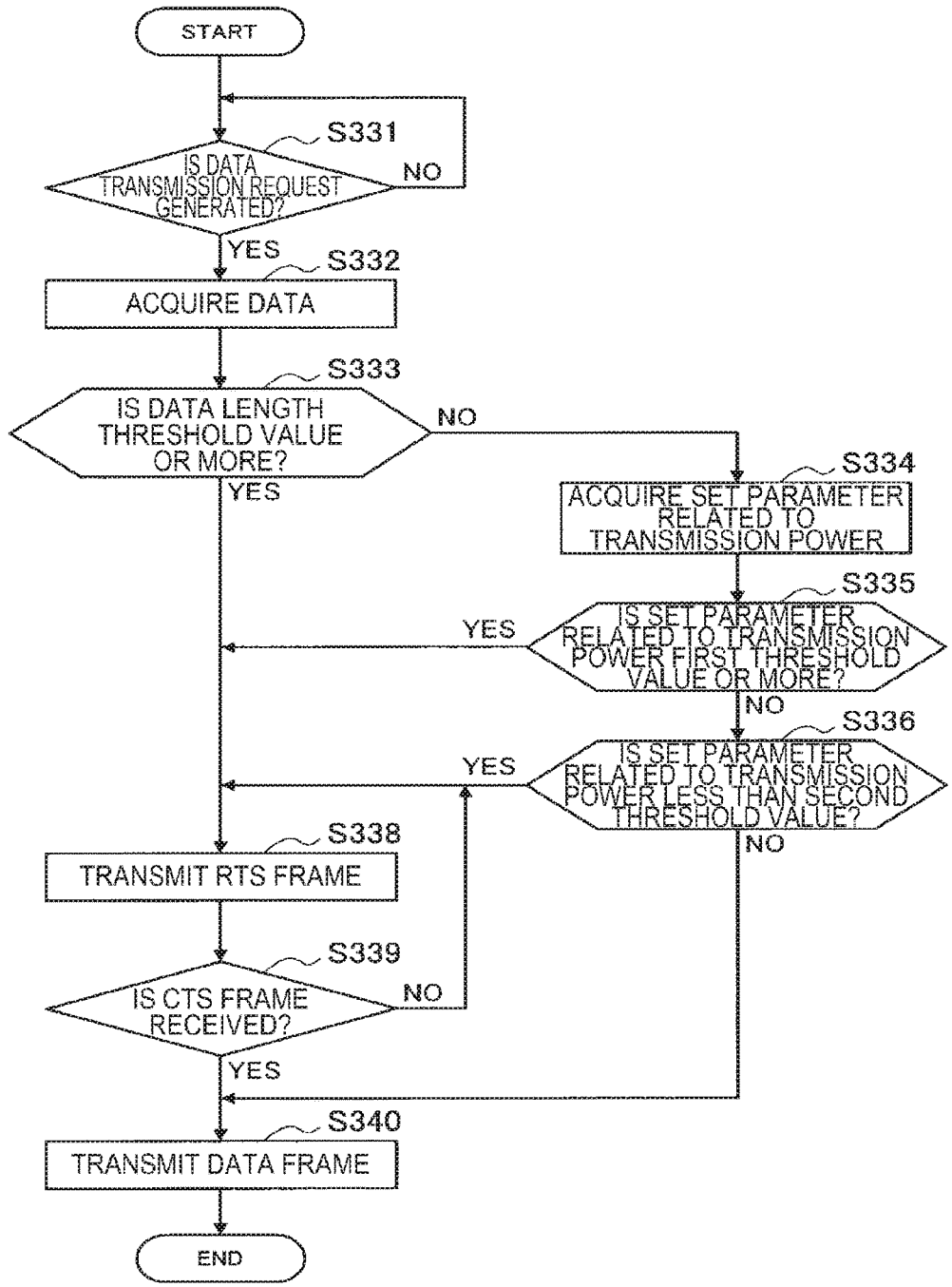

[Fig. 14]
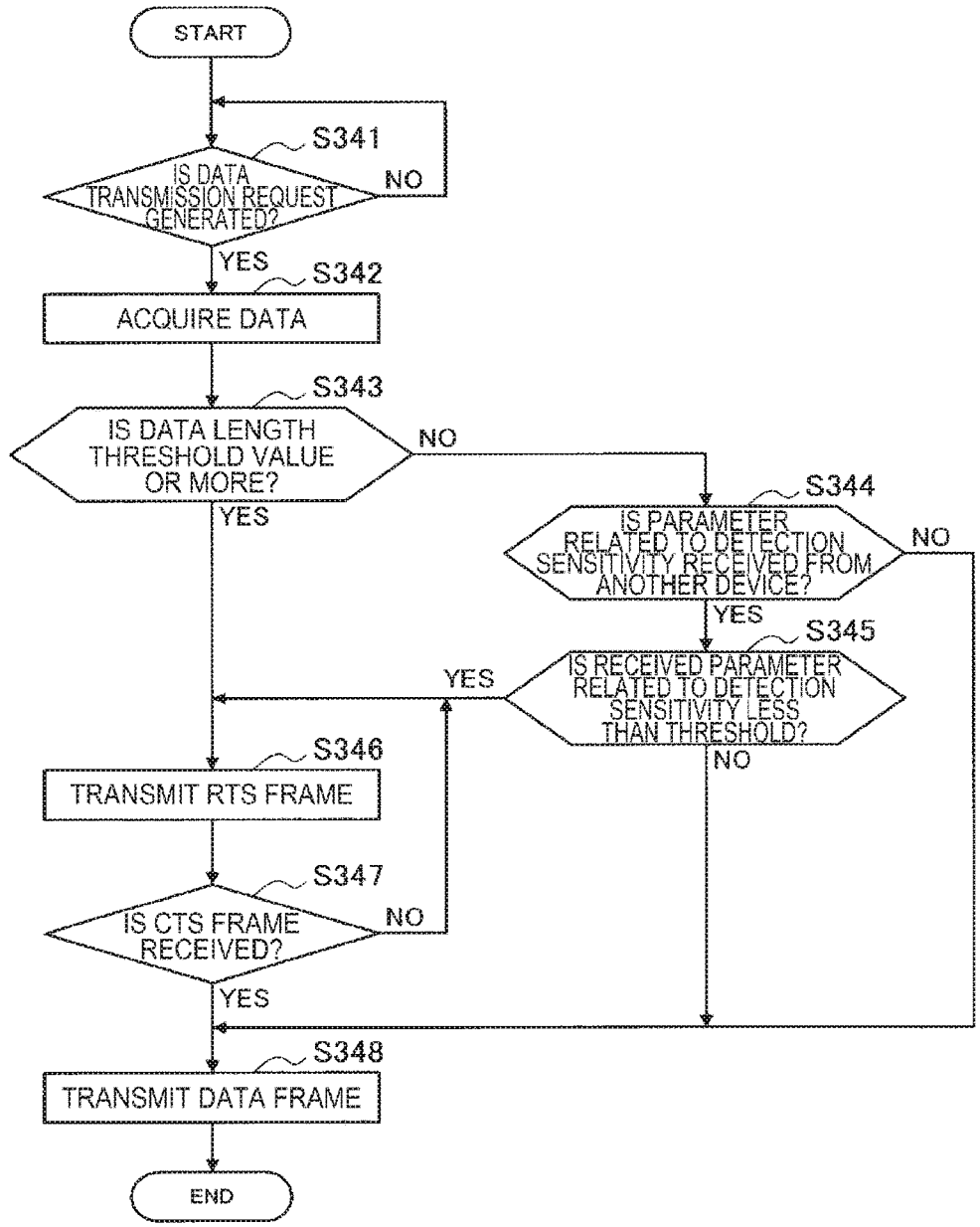

[Fig. 15]
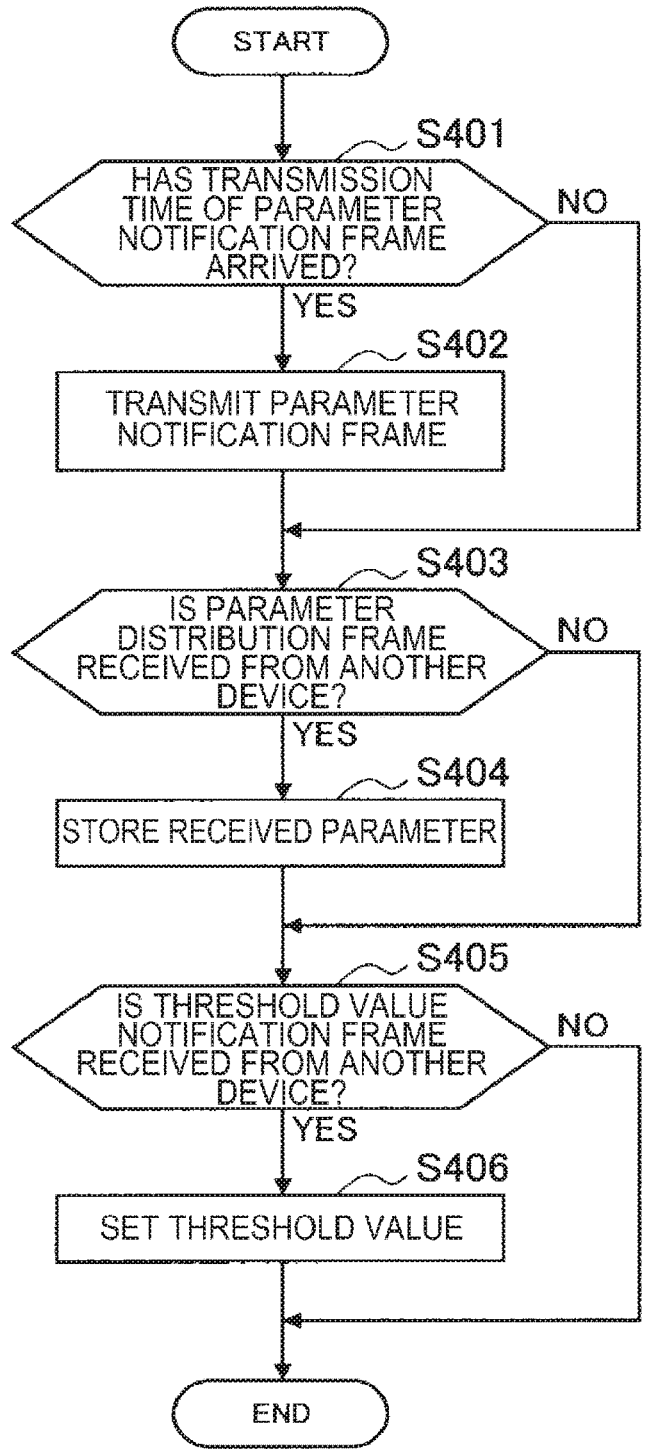

[Fig. 16]
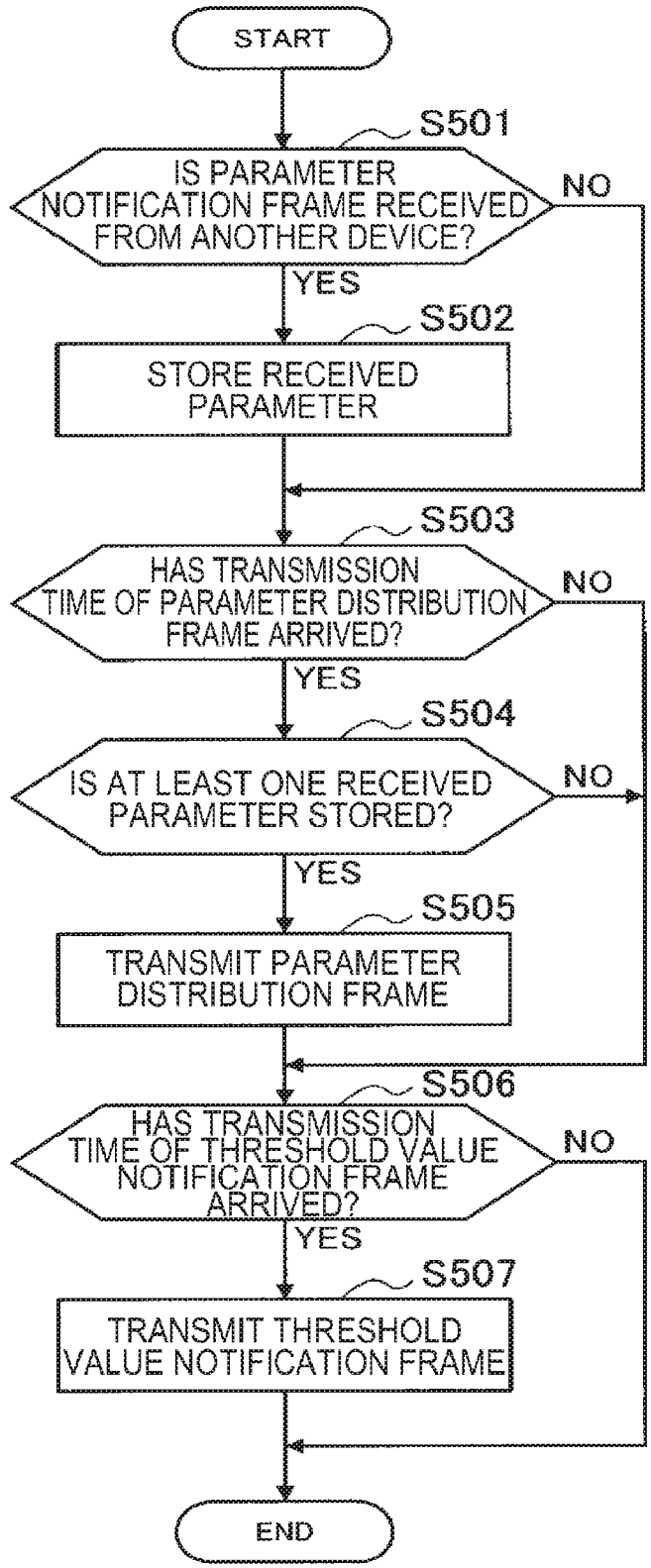

[Fig. 17]
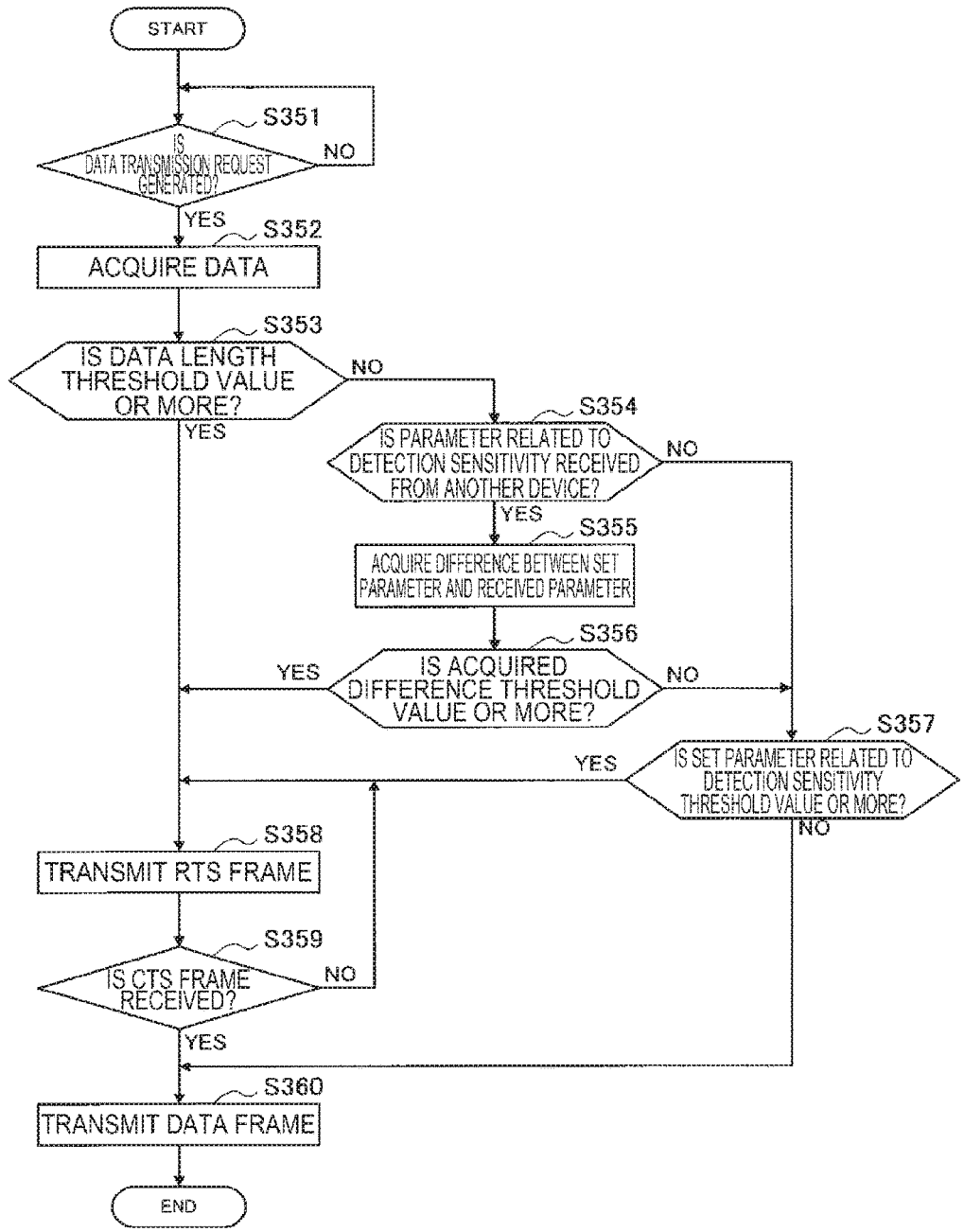

[Fig. 18]
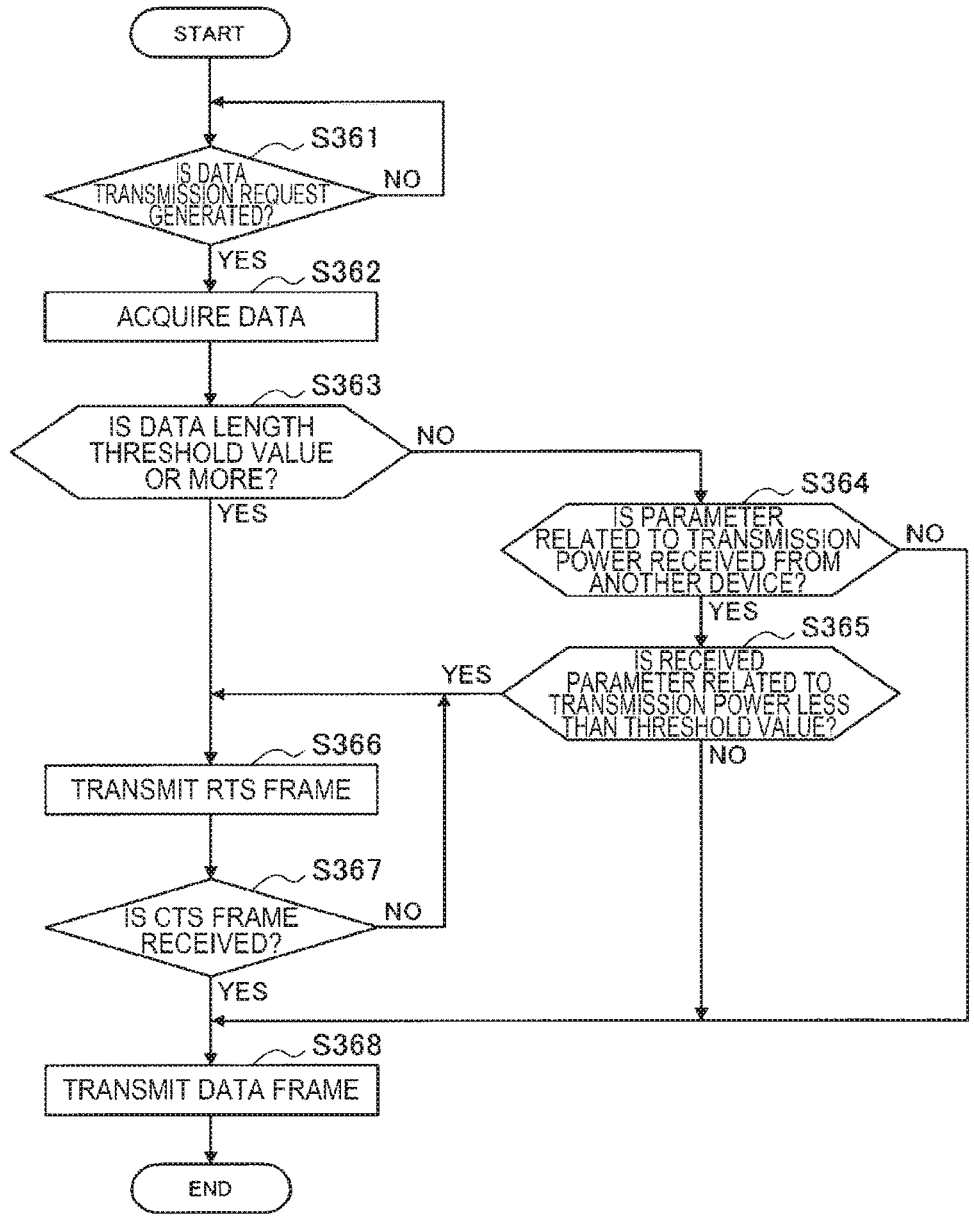

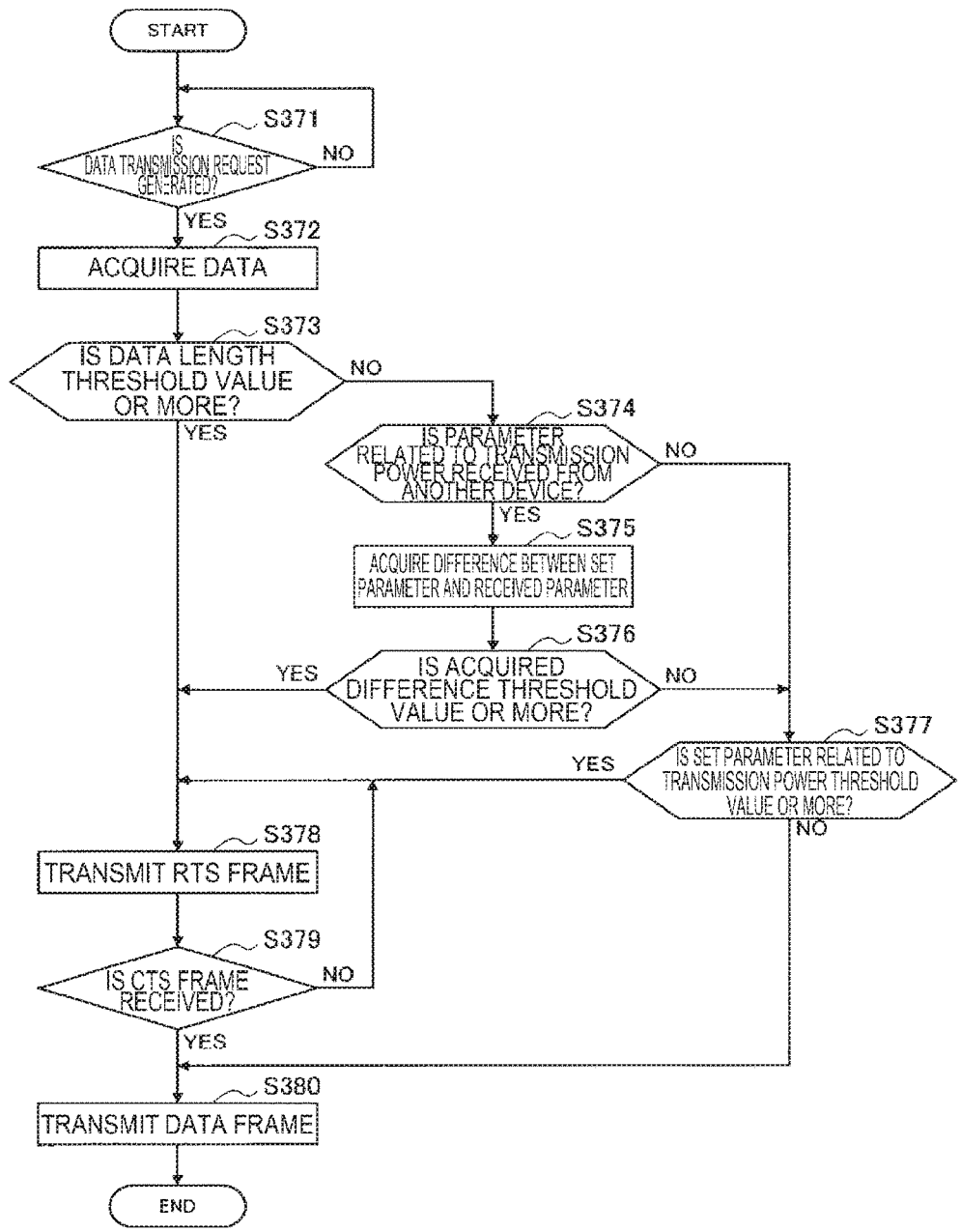
[Fig. 19]

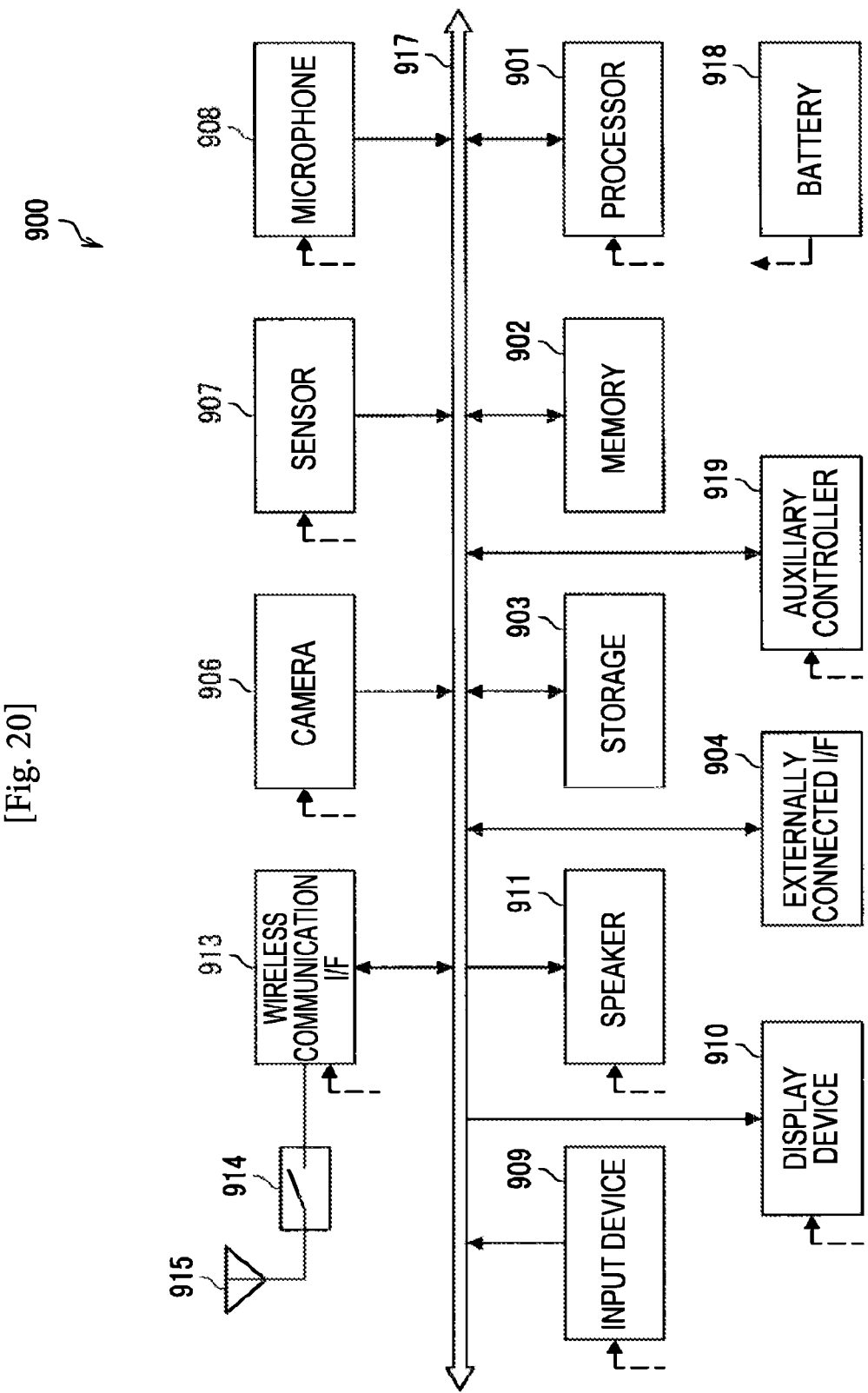

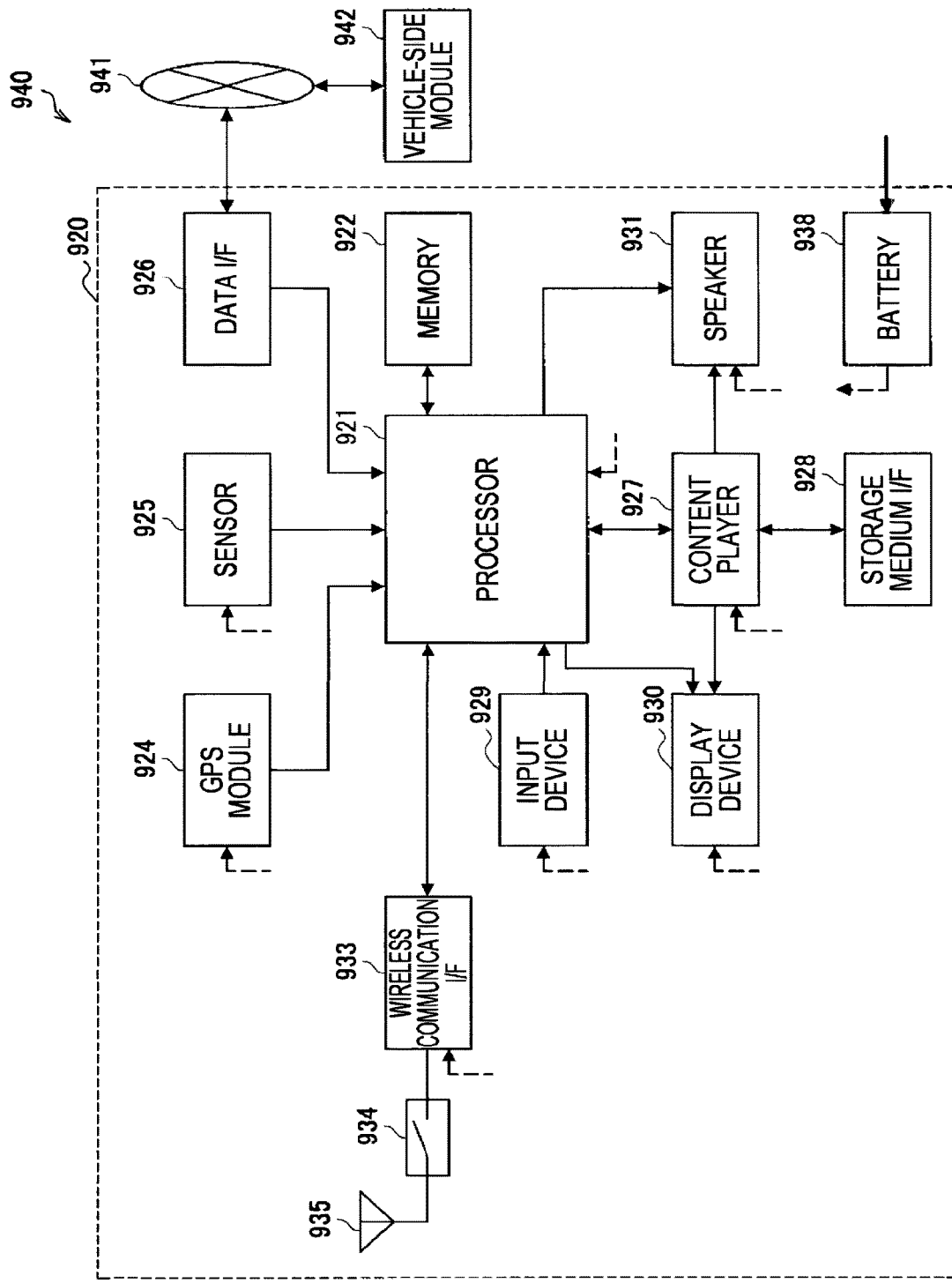

[Fig. 22]
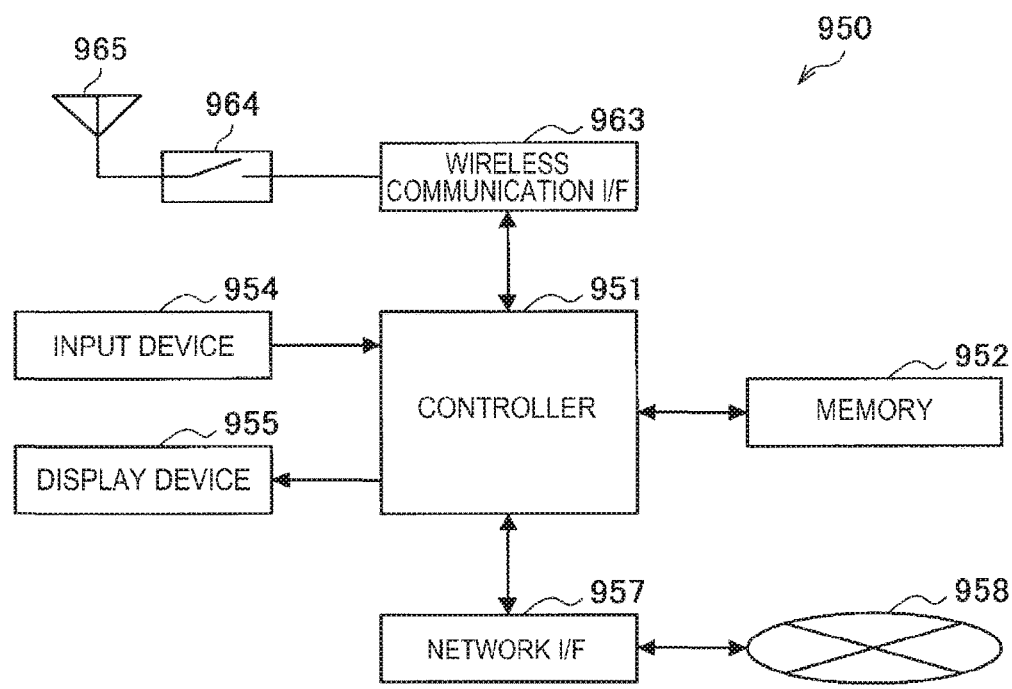

WIRELESS COMMUNICATION DEVICE AND WIRELESS COMMUNICATION METHOD

CROSS REFERENCE TO RELATED APPLICATIONS

This application is a continuation of U.S. patent application Ser. No. 15/570,402, filed Oct. 30, 2017, which is based on PCT filing PCT/JP2017/011446, filed Mar. 22, 2017, and claims priority to JP 2016-112042 filed Jun. 3, 2016, the entire contents of which are incorporated herein by reference.

BACKGROUND

Technical Field

The present disclosure relates to a wireless communication device and a wireless communication method.

Background Art

In recent years, use of wireless local area networks (LANs) representative of the Institute of Electrical and Electronics Engineers (IEEE) 802.11 has increased. Further, wireless LAN supporting products (hereinafter, also referred to as "wireless communication devices") are also increasing accordingly. In contrast, there are limitations on wireless communication resources available for communication. Therefore, it is desirable to improve the efficiency of communication between wireless communication devices.

As an example of a technique for improving communication efficiency, a technique called "virtual carrier sense" is known. Specifically, a mechanism such as request to send (RTS)/clear to send (CTS) disclosed in Non-Patent Literature 1 is known. For example, a transmitting device that desires data transmission transmits an RTS frame to a receiving device serving as a destination of data transmission and checks whether or not data transmission is possible. Then, when a CTS frame is received from the receiving device, the transmitting device determines that data transmission is permitted, and starts data transmission. A wireless communication device other than the destination of the RTS frame or the CTS frame sets an NAV and stops data transmission during an NAV period. As a result, communication collision is prevented, and communication efficiency can be improved consequently.

Here, in Non-Patent Literature 1, the RTS frame is specified to be transmitted when a length of data desired to be transmitted is longer than a predetermined threshold value (dot 11RTS Threshold).

CITATION LIST

Non Patent Literature

NPL 1: Non-Patent Literature 1: IEEE Std 802.11-2007, IEEE Standard for Information technology-Telecommunications and information exchange between systems-Local and metropolitan area networks-Specific requirements Part 11: Wireless LAN Medium Access Control (MAC) and Physical Layer (PHY) Specifications

SUMMARY

Technical Problem

However, in the technique disclosed in Non-Patent Literature 1, the communication resources may decrease. For example, when a plurality of wireless communication devices having different reception sensitivities are mixed, some wireless communication devices having relatively low reception sensitivity are likely not to detect signals (for example, data frames or RTS frames) transmitted from other wireless communication devices. Therefore, some wireless communication devices start transmission of a signal during communication of other wireless communication devices, and communication collision may occur consequently.

Further, for example, when a plurality of wireless devices having different transmission powers are mixed, if transmission power of some wireless communication devices is lower than transmission power of other wireless communication devices, the other wireless communication devices are likely not to detect signals (for example, data frames or RTS frames) transmitted from some wireless communication devices. Therefore, the other wireless communication devices start transmission of a signal during communication of some wireless communication devices, and communication collision may occur consequently.

In this regard, the present disclosure proposes a mechanism which is capable of suppressing degradation in communication efficiency in a situation in which a plurality of wireless communication devices having different detection sensitivities or transmission power are mixed.

Solution to Problem

According to an embodiment of the present disclosure, there is provided an electronic device that determines a first parameter corresponding to a length or duration of data to be transmitted by the electronic device; determines whether the first parameter exceeds a predetermined threshold value; controls a wireless interface of the electronic device to transmit a request to send the data when the parameter exceeds the predetermined threshold value; acquires a second parameter related to detection sensitivity or transmission power; and determines, when the first parameter does not exceed the predetermined threshold value, whether to transmit the request to send the data prior to transmitting the data based on the second parameter.

According to an embodiment of the present disclosure, there is provided a method performed by an electronic device that includes determining a first parameter corresponding to a length or duration of data to be transmitted by the electronic device; determining whether the first parameter exceeds a predetermined threshold value; controls a wireless interface of the electronic device to transmit a request to send the data when the parameter exceeds the predetermined threshold value; acquiring a second parameter related to detection sensitivity or transmission power; and determining, when the first parameter does not exceed the predetermined threshold value, whether to transmit the request to send the data prior to transmitting the data based on the second parameter.

Advantageous Effects of Invention

As described above, according to an embodiment of the present disclosure, a mechanism which is capable of suppressing degradation in communication efficiency in a situation in which a plurality of wireless communication devices having different detection sensitivities or transmission power are mixed is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing a technique for controlling reception sensitivity.

FIG. 2 is a diagram for describing a technique for controlling reception sensitivity.

FIG. 3 is a diagram for describing an example in which communication collision occurs when a technique for controlling reception sensitivity is used.

FIG. 4 is a diagram illustrating a relation between transmission power and reception power in communication between wireless communication devices.

FIG. 5 is a diagram illustrating a relation between transmission power and reception power in communication between wireless communication devices.

FIG. 6 is a diagram illustrating a relation between transmission power and reception power in communication between wireless communication devices.

FIG. 7 is a diagram illustrating an example of virtual carrier sense using an RTS and a CTS.

FIG. 8 is a block diagram illustrating an example of a schematic functional configuration of a wireless communication device according to embodiments of the present disclosure.

FIG. 9 is a flowchart conceptually illustrating an example of a data transmission process of an STA according to a first embodiment of the present disclosure.

FIG. 10 is a frame sequence illustrating an exemplary operation of an STA according to the same embodiment.

FIG. 11 is a flowchart conceptually illustrating an example of a data transmission process of an STA according to a modified example of the same embodiment.

FIG. 12 is a flowchart conceptually illustrating an example of a data transmission process of an STA according to a second embodiment of the present disclosure.

FIG. 13 is a flowchart conceptually illustrating an example of a data transmission process of an STA according to a modified example of the same embodiment.

FIG. 14 is a flowchart conceptually illustrating an example of a data transmission process of an STA according to a third embodiment of the present disclosure.

FIG. 15 is a flowchart conceptually illustrating an example of a parameter-related process of an STA according to the same embodiment.

FIG. 16 is a flowchart conceptually illustrating an example of a parameter-related process of an AP according to the same embodiment.

FIG. 17 is a flowchart conceptually illustrating an example of a data transmission process of an STA according to a modified example of the same embodiment.

FIG. 18 is a flowchart conceptually illustrating an example of a data transmission process of an STA according to a fourth embodiment of the present disclosure.

FIG. 19 is a flowchart conceptually illustrating an example of a data transmission process of an STA according to a modified example of the same embodiment.

FIG. 20 is a block diagram illustrating an example of a schematic configuration of a smartphone.

FIG. 21 is a block diagram illustrating an example of a schematic configuration of a car navigation apparatus.

FIG. 22 is a block diagram illustrating an example of a schematic configuration of a wireless access point.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, a plurality of elements having substantially the same function are also distinguished by adding different numbers after the same reference numerals in some cases. For example, a plurality of elements having substantially the same function are distinguished as necessary like an STA 100A and an STA 100B. However, if it is not necessary to distinguish elements having substantially the same function, only the same reference numerals are assigned. For example, when there is no need to particularly distinguish an STA 100A and an STA 100B, they are referred to as simply as an "STA 100."

The description will proceed in the following order.

Introduction
Configuration of device
First embodiment (RTS transmission control using set parameter related to detection sensitivity)
   3-1. Functions of device
   3-2. Flow of process
   3-3. Application examples
   3-4. Conclusion of first embodiment
   3-5. Modified example
4. Second embodiment (RTS transmission control using set parameter related to transmission power)
   4-1. Functions of device
   4-2. Flow of process
   4-3. Conclusion of second embodiment
   4-4. Modified example
5. Third embodiment (RTS transmission control using received parameter related to detection sensitivity)
   5-1. Functions of device
   5-2. Flow of process
   5-3. Conclusion of third embodiment
   5-4. Modified example
6. Fourth embodiment (RTS transmission control using received parameter related to transmission power)
   6-1. Functions of device
   6-2. Flow of process
   6-3. Conclusion of fourth embodiment
   6-4. Modified example
7. Application example
8. Conclusion

1. INTRODUCTION

First, a technique related to a wireless communication device according to embodiments of the present disclosure will be described. As this technique, a technique for controlling reception sensitivity is known. A technique for controlling reception sensitivity will be described with reference to FIGS. 1 and 2. FIGS. 1 and 2 are diagrams for describing a technique for controlling reception sensitivity.

An STA 10A and an AP 20A serving as a wireless communication device are assumed to communicate with an STA 10B and an AP 20B. In this case, as illustrated in FIG. 1, communication between the STA 10B and the AP 20B may be started during communication between the STA 10A and the AP 20A. At this time, communication collision is likely to occur. For example, when the reception sensitivity at which signals within ranges indicated by lines alternating between dashes and pairs of dots in FIG. 1 can be detected is set in each of the STAs 10A and 10B, a signal transmitted from the STA 10B is likely to be detected by the STA 10A which is performing communication. When the signal of the STA 10B is detected, communication between the STA 10A and the AP 20A is disturbed.

In this regard, the technique for controlling the reception sensitivity has been proposed. For example, as illustrated by lines alternating between dashes and pairs of dots in FIG. 2, the STAs 10A and 10B decrease their reception sensitivity below the reception sensitivity illustrated in FIG. 1, that is, the signal detection ranges are narrowed. As a result, signals are unlikely to be detected by the STAs 10A and 10B. Thus, although the STA 10B starts communication during the communication of the STA 10A, the communication of the STA 10A is not disturbed.

However, in the technique of controlling the reception sensitivity, the communication efficiency may decrease. A problem of the technique for controlling the reception sensitivity will be described with reference to FIGS. 3 to 6. FIG. 3 is a diagram for describing an example in which communication collision occurs when the technique for controlling the reception sensitivity is used. FIGS. 4 to 6 are diagrams illustrating a relation between transmission power and reception power in communication between wireless communication devices.

Here, two STAs 10A and 10B are assumed to communicate with an AP 20. As illustrated in FIG. 3, the STA 10A is located at a position farther from the AP 20 than the STA 10B. Both of the STAs 10A and 10B can communicate with the AP 20. In other words, the AP 20 is within the ranges of the reception sensitivities of the STAs 10A and 10B as indicated by lines alternating between dashes and pairs of dots in FIG. 3.

The reception sensitivities of the STA 10A and the STA 10B are controlled such that the STA 10A and the STA 10B communicate with the AP 20. For example, for the STA 10A, as illustrated in FIG. 4, when a signal detection level is increased from a reference level L1 to a level L2 at which the signal transmitted from the AP 20 can be detected, the reception sensitivity is lowered. Here, the strength of the signal transmitted from the AP 20 is generally attenuated on a transmission path, and the strength (that is, the reception power) of the signal received by the STA 10A is lower than the transmission power. However, the reception power is sufficiently high for the STA 10A to detect the signal at the reference level L1, and further, the STA 10A can detect the signal transmitted from the AP 20 even when the signal detection level is the level L2. In this regard, the signal detection level of the STA 10A is increased to the level L2, and thus the reception sensitivity is lowered to a level at which the transmission signal of the AP 20 can be received.

For the STA 10B, as illustrated in FIG. 5, when the signal detection level is decreased from the reference level L1 to a level L3 at which the signal transmitted from the AP 20 can be detected, the reception sensitivity is increased. In detail, the reception power of the signal transmitted from the AP 20 is too low for the STA 10B to detect the signal at the reference level L1, and the STA 10A is unable to detect the signal transmitted from the AP 20 unless the signal detection level is near the level L3. In this regard, the signal detection level of the STA 10A is decreased to the level L3, and thus the reception sensitivity is increased to a level at which the transmission signal of the AP 20 can be received.

Meanwhile, the STA 10B is located outside the range of the reception sensitivity of the STA 10A. For this reason, the STA 10A is unable to detect the signal transmitted from the STA 10B. For example, as illustrated in FIG. 6, the reception power of the STA 10A related to the signal transmitted from the STA 10B is higher than the reference level L1. However, since the signal detection level of the STA 10A is increased to the level L2, the signal transmitted from STA 10B is not detected by the STA 10A.

In this situation, if a communication request occurs in the STA 10A during transmission of the signal by the STA 10B, the STA 10A is unable to detect the signal transmitted from the STA 10B. For this reason, the STA 10A determines that the transmission path is empty, and starts signal transmission. As a result, communication collision occurs, and the communication of the STA 10B is disturbed by the communication start of the STA 10A. In other words, the communication efficiency is likely to decrease.

The example in which the reception sensitivity set in the wireless communication device is lower than the reception sensitivity set in another wireless communication device has been described above, but the same applies when the transmission power set in the wireless communication device is higher than the transmission power of another wireless communication device. For example, the AP 20 and the STA 10B which is lower in transmission power than the STA 10A and located closer to the AP 20 than the STA 10A are assumed to be within the transmission range of the STA 10A. In this case, even though the STA 10B and the AP 20 communicate, the signal transmitted from the STA 10B may not be detected by the STA 10A. In this situation, when a signal is transmitted from the STA 10A to the AP 20, communication collision occurs, and the communication of the STA 10B is disturbed. In other words, the communication efficiency may decrease.

Here, the mechanism called virtual carrier sense mentioned above is known as a technique for preventing communication collision. Specifically, a mechanism such as RTS/CTS is used in virtual carrier sense. A typical flow of virtual carrier sense will be described with reference to FIG. 7. FIG. 7 is a diagram illustrating an example of virtual carrier sense using RTS and CTS.

The STA 10A that desires data transmission transmits an RTS frame to the AP 20 that is the destination of data transmission as illustrated in FIG. 7. When it is possible to receive data from the STA 10A, the AP 20 that has received the RTS frame determines that the data transmission is permitted for the STA 10A, and transmits a CTS frame to the STA 10A. In communication devices other than the AP 20 and the STA 10A serving as the destination of the RTS frame or the CTS frame (for example, the STA 10B), when the RTS frame or the CTS frame is received, an NAV is set on the basis of transmission period information stored in the RTS frame or the CTS frame as illustrated in FIG. 7. The STA 10B stops signal transmission in an NAV period.

As described above, the STA 10A which desires data transmission checks whether or not the AP 20 serving as the data transmission destination can perform communication before the data transmission, and thus it is possible to prevent communication related to the data transmission from being wasted due to communication collision.

In this regard, the present disclosure proposes a mechanism which is capable of checking whether or not a communication partner can perform communication according to detection sensitivity or transmission power.

2. CONFIGURATION OF DEVICE

Next, functional configurations of an STA 100 and an AP 200 serving as wireless communication devices according to embodiments of the present disclosure will be described with reference to FIG. 8. Since the functional configurations of the STA 100 and the AP 200 are substantially the same, only the STA 100 will be described. FIG. 8 is a block diagram illustrating an example of a schematic functional configuration of a wireless communication device according to embodiments of the present disclosure.

As illustrated in FIG. 8, the STA 100 includes a data processing unit 110, a wireless communication unit 120, a control unit 130, and a storage unit 140.

The data processing unit 110 performs a process for transmitting and receiving data as a part of a transmitting unit and an acquiring unit. Specifically, the data processing unit 110 generates a frame on the basis of data transmitted from an upper communication layer, and provides the generated frame to the wireless communication unit 120. For example, the data processing unit 110 generates a frame (or a packet) from data and performs, for example, a process of performing addition of a media access control (MAC) header for MAC control and addition of an error detection code to the generated frame. Further, the data processing unit 110 extracts data from a received frame and provides extracted data to the upper communication layer. For example, the data processing unit 110 acquires data by performing analysis of the MAC header, detection and correction of a code error, a reordering process, and the like on the received frame.

As part of the transmitting unit and the acquiring unit, the wireless communication unit 120 performs signal processing such as modulation and demodulation on the frame and performs transmission and reception of signals via an antenna. Specifically, the wireless communication unit 120 generates a symbol stream by performing encoding, interleaving, and modulation on the frame provided from the data processing unit 110 according to coding and modulation schemes set by the control unit 130 and the like. Then, the wireless communication unit 120 performs analog signal conversion, amplification, filtering, and frequency up-conversion on a signal related to the obtained symbol stream. Then, the wireless communication unit 120 transmits the processed signal via the antenna. Further, the wireless communication unit 120 obtains a symbol stream by performing a process opposite to that at the time of signal transmission, for example, frequency down-conversion and digital signal conversion, on a signal obtained via an antenna. Then, the wireless communication unit 120 acquires a frame by performing demodulation, decoding, and the like on the obtained symbol stream, and provides the acquired frame to the data processing unit 110 or the control unit 130.

The control unit 130 controls the communication of the STA 100 in general as part of the transmitting unit and the acquiring unit. Specifically, the control unit 130 performs processes such as exchange of information between functions, setting of communication parameters, and scheduling of a frame (or a packet) in the data processing unit 110.

The storage unit 140 stores information used for a process of the data processing unit 110 or the control unit 130. Specifically, the storage unit 140 stores information stored in the frame, information acquired from the frame, information of the communication parameters, and the like.

The STA 100 and the AP 200 may perform wired communication. For example, each of the STA 100 and the AP 200 may be provided with a wired communication unit which is connected to the Internet and performs communication with an external device via the Internet.

3. FIRST EMBODIMENT

Next, a wireless communication device (hereinafter, also referred to as a "wireless communication device 100 or 200") according to the first embodiment of the present disclosure will be described. In the first embodiment, the STA 100 whose detection sensitivity is controlled will be described.

3-1. Functions of Device

First, functions of the STA 100 according to the present embodiment will be described.

(Control of Detection Sensitivity)

The detection sensitivity of the STA 100 is controlled. Specifically, the control unit 130 controls the detection sensitivity according to the transmission power. The detection sensitivity includes the reception sensitivity, and parameters related to control of detection sensitivity include the signal detection level (a detection threshold value). For detection of a signal, for example, a preamble is detected. For example, the control unit 130 decreases the signal detection level (that is, increases the detection sensitivity) with the increase in the transmission power. Further, the control unit 130 increases the signal detection level (that is, decreases the detection sensitivity) with the decrease in the transmission power. A parameter related to control of the detection sensitivity may be an energy detection level. For example, the control unit 130 controls an energy detection level related to received radio waves instead of or together with the signal detection level according to the transmission power. Further, the detection sensitivity may be controlled on the basis of other information. For example, the control unit 130 may set the detection sensitivity indicated by setting information received from the AP 200. Further, instead of the transmission power, information that varies according to the transmission power may be used. For example, the control unit 130 may control the detection sensitivity according to a remaining amount of a battery with which the STA 100 is equipped.

(Transmission Control of RTS)

The STA 100 controls transmission of a first signal related to confirmation of whether or not transmission is possible. Specifically, when a data transmission request is generated, the control unit 130 determines whether or not the first signal is transmitted on the basis of a data length. For example, when data is provided together with the data transmission request from the upper communication layer, the control unit 130 determines whether or not the RTS frame is transmitted according to whether a length or a size of the data is a predetermined threshold value or more.

Further, the control unit 130 controls the transmission of the first signal on the basis of a parameter related to the detection sensitivity. Specifically, the control unit 130 controls the transmission of the RTS frame on the basis of a parameter related to the detection sensitivity set in the STA 100 (hereinafter, also referred to as a "set parameter related to detection sensitivity"). For example, when a length of data related to the data transmission request is less than a predetermined threshold value, and the signal detection level set in the STA 100 is a predetermined threshold value or more, the control unit 130 decides that the RTS frame is transmitted.

The threshold value of the data length and the threshold value of the parameter related to the detection sensitivity are stored in the storage unit 140 in advance. The threshold values may be obtained from an external device via communication. The details will be described in third and fourth embodiments.

3-2. Flow of Process

Next, a data transmission process of the STA 100 will be described with reference to FIG. 9. FIG. 9 is a flowchart conceptually illustrating an example of a data transmission process of the STA 100 according to the first embodiment of the present disclosure.

The STA 100 determines whether or not a data transmission request is generated (step S301). Specifically, the control unit 130 determines whether or not a notification indicating a data transmission request is given from the upper communication layer.

When a data transmission request is determined to be generated (YES in step S301), the STA 100 acquires data (step S302). Specifically, the control unit 130 causes the data processing unit 110 to acquire data provided together with the data transmission request from a transmission buffer.

Then, the STA 100 determines whether or not a data length is the threshold value or more (step S303). Specifically, the data processing unit 110 calculates a length of the acquired data, and the control unit 130 determines whether or not the calculated data length is a threshold value or more.

When the data length is determined to be less than the threshold value (NO in step S303), the STA 100 acquires the set parameter related to the detection sensitivity (step S304). Specifically, when the data length is determined to be less than the threshold value, the control unit 130 acquires a detection level of a signal or energy set in the STA 100 (hereinafter, also referred to as a "set detection level").

Then, the STA 100 determines whether or not the set parameter related to the detection sensitivity is a threshold value or more (step S305). Specifically, the control unit 130 determines whether or not the set detection level is a threshold value stored in advance or more.

When the data length is determined to be the threshold value or more (YES in step S303) or when the set parameter related to the detection sensitivity is determined to be the threshold value or more (YES in step S305), the STA 100 transmits the RTS frame (step S306). Specifically, when the length of the data related to transmission is the threshold value or more or when the set detection level is the threshold value stored in advance or more, the control unit 130 causes the data processing unit 110 to generate the RTS frame addressed to the data transmission destination (for example, the AP 200). Then, the wireless communication unit 120 transmits the generated RTS frame.

Then, the STA 100 determines whether or not the CTS frame is received (step S307). Specifically, the control unit 130 determines whether or not the CTS frame serving as a response to the RTS frame is received from the destination of the RTS frame.

When the set parameter related to the detection sensitivity is determined to be less than the threshold value (NO in step S305) or when the CTS frame is determined to be received (YES in step S307), the STA 100 transmits a data frame (step S308). Specifically, when the set detection level is determined to be less than the threshold value stored in advance or when the CTS frame serving as a response to the transmitted RTS frame is received, the control unit 130 causes the data processing unit 110 to generate a data frame in which the data related to the data transmission request is stored. Then, the wireless communication unit 120 transmits the generated data frame.

3-3. Exemplary Operation

Next, an exemplary operation of the STA 100 will be described with reference to FIG. 10. FIG. 10 is a frame sequence illustrating an exemplary operation of the STA 100 according to the present embodiment. Here, the description will proceed with an example in which the data transmission request is generated in the STA 100A during communication between the STA 100B and the AP 200.

The STA 100B starts transmission of the data frame to the AP 200 as illustrated in FIG. 10. The AP 200 receives the data frame transmitted from the STA 100B. On the other hand, since the detection sensitivity is decreased, the STA 100A does not receive the data frame transmitted from the STA 100B. The data frame may be an aggregated MAC protocol data unit (AMPDU).

When the data transmission request is generated, the STA 100A determines whether or not the RTS frame is transmitted on the basis of the set parameter related to the data length and the detection sensitivity (for example, the signal detection level). Here, since the detection sensitivity is decreased, the STA 100A transmits the RTS frame although the data length is less than the threshold value.

However, since the AP 200 is communicating with the STA 100B, the AP 200 does not receive the RTS frame transmitted from the STA 100A. For this reason, the CTS frame is not transmitted from the AP 200, and the STA 100A does not receive the CTS frame. In other words, the STA 100A is caused to be on standby until the communication of the AP 200 ends.

When the transmission of the data frame from the STA 100B ends, the AP 200 transmits an ACK frame to the STA 100B. On the other hand, the STA 100A that did not receive the CTS frame retransmits the RTS frame. When the ACK frame from the AP 200 is received, the STA 100A may retransmit the RTS frame on the basis of reception of the ACK frame.

Since the communication with the STA 100B has ended, the AP 200 receives the RTS frame transmitted from the STA 100A, and transmits the CTS frame to the STA 100A. When the CTS frame is received, the STA 100A starts transmission of the data frame.

3-4. Conclusion of First Embodiment

As described above, according to the first embodiment of the present disclosure, the wireless communication device 100 acquires the parameter related to the detection sensitivity, and transmits the first signal related to the confirmation of whether or not the transmission is possible on the basis of the acquired parameter. Here, when the detection sensitivity decreases, signals transmitted from other wireless communication devices are unlikely to be detected. Therefore, it is difficult to detect the communication between its own communication partner and another wireless communication device. As a result, data transmission to the communication partner may be initiated. Consequently, communication collision occurs, and communication efficiency may decrease. On the other hand, according to the wireless communication device 100 according to the present embodiment, since it is confirmed whether or not the transmission is possible according to the detection sensitivity, it is possible to more reliably prevent the communication collision when the wireless communication devices have different detection sensitivities. Therefore, it is possible to suppress the decrease in the communication efficiency in a situation in which a plurality of wireless communication devices having different detection sensitivities are mixed. In particular, when the detection sensitivity is variable, it is possible to increase the certainty of preventing the communication collision while increasing a space utilization rate of wireless communication resources.

Further, the parameters include the parameter set in the wireless communication device 100. For this reason, it is possible to control the transmission of the first signal only through the information included in the wireless communication device 100. Therefore, it is possible to suppress the increase in the overhead on the transmission control of the first signal.

Further, the wireless communication device 100 transmits the first signal when the parameter related to the detection sensitivity is a threshold value or more. For this reason, the first signal is transmitted only when the detection sensitivity is a predetermined degree or less, and it is possible to suppress an excessive increase in a transmission frequency of the first signal. Therefore, the transmission frequency of the first signal is optimized, and it is possible to reduce a load on a communication process or communication resources to be used.

Further, the parameters related to the detection sensitivity include at least one of a signal detection threshold value and an energy detection threshold value. Therefore, by controlling the transmission of the first signal according to the signal detection threshold value, signal collision can be prevented. Further, by controlling the transmission of the first signal according to the energy detection threshold value, it is possible to suppress the data transmission from being disturbed by radio waves that are not related to the signal.

Further, the first signal includes an RTS frame. For this reason, it is possible to use a known RTS/CTS mechanism for checking whether or not transmission is possible. Therefore, it is possible to easily implement the wireless communication device 100.

Further, the wireless communication device 100 transmits the RTS frame on the basis of the length of data to be transmitted and the above-mentioned parameter. Therefore, by adding a condition using the parameter related to the detection sensitivity to a known RTS frame transmission condition, the transmission control of the RTS frame can be implemented more simply than when the transmission control of the RTS frame is performed individually for each of the conditions.

3-5. Modified Example

The first embodiment of the present disclosure has been described above. The present embodiment is not limited to the above example. A modified example of the present embodiment will be described below.

As a modified example of the present embodiment, the wireless communication device 100 may control the transmission of the first signal on the basis of information other than the value of the parameter related to the detection sensitivity. Specifically, the control unit 130 transmits the first signal on the basis of a change in the parameter related to the detection sensitivity. For example, the control unit 130 controls the transmission of the RTS frame on the basis of a change from a reference value of the signal detection level. Further, a process of the present modified example will be described with reference to FIG. 11. FIG. 11 is a flowchart conceptually illustrating an example of a data transmission process of the STA 100 according to the modified example of the present embodiment. Description of processes which are substantially the same as the processes described above will be omitted.

When the data transmission request is generated (YES in step S311), the STA 100 acquires data (step S312). Then, the STA 100 determines whether or not the length of the acquired data is a threshold value or more (step S313).

When the data length is determined to be less than the threshold value (NO in step S313), the STA 100 acquires the set parameter related to the detection sensitivity (step S314), and determines whether or not the set parameter related to the detection sensitivity is changed so that the detection sensitivity is decreased (step S315). Specifically, the control unit 130 acquires the set detection level and determines whether or not the acquired set detection level is changed to be higher than the reference level.

When the set parameter related to the detection sensitivity is determined to be changed so that the detection sensitivity is decreased (YES in step S315), the STA 100 transmits the RTS frame (step S316). Specifically, when it is determined that the set detection level has been changed to a value higher than the reference level, the control unit 130 causes the data processing unit 110 to generate an RTS frame for the data transmission destination. Then, the wireless communication unit 120 transmits the generated RTS frame.

On the other hand, when the set parameter related to the detection sensitivity is determined not to be changed or the set parameter related to the detection sensitivity is determined to be changed so that the detection sensitivity is increased (NO in step S315), the STA 100 transmits the data frame without transmitting the RTS frame (step S318). Specifically, when the set detection level is determined not to be changed from the reference level or is changed to a value lower than the reference level, the control unit 130 causes the data processing unit 110 to generate the data frame to be transmitted to the data transmission destination. Then, the wireless communication unit 120 transmits the generated data frame.

Thus, according to the modified example of the present embodiment, the wireless communication device 100 transmits the first signal on the basis of the change in the parameter related to the detection sensitivity. For this reason, it is possible to control the transmission of the first signal without setting a threshold value of the parameter related to the detection sensitivity. Therefore, it is possible to reduce the information related to the transmission control of the first signal and reduce the overhead on the transmission control of the first signal.

4. SECOND EMBODIMENT

Next, a wireless communication device 100 according to a second embodiment of the present disclosure will be described. In the second embodiment, the STA 100 whose transmission power is controlled will be described.

4-1. Functions of Device

First, functions of the STA 100 according to the present embodiment will be described. Description of functions which are substantially the same as those of the first embodiment will be omitted.

(Control of Transmission Power)

The STA 100 controls the transmission power. Specifically, the control unit 130 controls the transmission power according to the detection sensitivity. As a parameter related to transmission power control, there is a transmission power value. For example, the control unit 130 increases the transmission power value with the increase in the detection sensitivity. Further, the control unit 130 decreases the transmission power value with the decrease in the detection sensitivity.

(Transmission Control of RTS)

The STA 100 controls the transmission of the first signal on the basis of the parameter related to the transmission power. Specifically, the control unit 130 controls the transmission of the RTS frame on the basis of the parameter related to the transmission power set in the STA 100 (hereinafter, also referred to as a "set parameter related to transmission power"). For example, when the length of data related to the data transmission request is less than a predetermined threshold value, and the transmission power value set in the STA 100 (hereinafter, also referred to as a "set transmission power value") is a predetermined threshold value or more, the control unit 130 decides that the RTS frame is transmitted.

The threshold value of the parameter related to the transmission power is stored in the storage unit 140 in advance. The threshold value may be obtained from an external device via communication. The details will be described in the third and fourth embodiments.

4-2. Flow of Process

Next, a data transmission process of the STA 100 will be described with reference to FIG. 12. FIG. 12 is a flowchart conceptually illustrating an example of a data transmission process of the STA 100 according to the second embodiment of the present disclosure. Description of processes which are substantially the same as the processes described above will be omitted.

When the data transmission request is generated (YES in step S321), the STA 100 acquires data (step S322). Then, the STA 100 determines whether or not the length of the acquired data is a threshold value or more (step S323).

When the data length is determined to be less than the threshold value (NO in step S323), the STA 100 acquires the set parameter related to the transmission power (step S324). Specifically, the control unit 130 acquires the set transmission power value from the storage unit 140 in the STA 100.

Then, the STA 100 determines whether or not the set parameter related to the transmission power is a threshold value or more (step S325). Specifically, the control unit 130 determines whether or not the acquired set transmission power value is a threshold value or more.

When the set parameter related to the transmission power is determined to be a threshold value or more (YES in step S325), the STA 100 transmits the RTS frame (step S326). Specifically, when the set transmission power value is determined to be a threshold value or more, the control unit 130 causes the data processing unit 110 to generate the RTS frame. Then, the wireless communication unit 120 transmits the generated RTS frame.

On the other hand, when the set parameter related to the transmission power is determined to be less than the threshold value (NO in step S325), the STA 100 transmits the data frame without transmitting the RTS frame (step S328). Specifically, when the set transmission power value is determined to be less than the threshold value, the control unit 130 causes the data processing unit 110 to generate a data frame to be transmitted to the data transmission destination. Then, the wireless communication unit 120 transmits the generated data frame.

4-3. Conclusion of Second Embodiment

As described above, according to the second embodiment of the present disclosure, the wireless communication device 100 acquires the parameter related to the transmission power, and transmits the first signal related to confirmation of whether or not transmission is possible on the basis of the acquired parameter. Generally, as the transmission power increases, a range that a transmitted signal reaches expands. Thus, the transmitted signal is likely to collide with a signal in communication of another wireless communication device. As a result, the communication efficiency may decrease. On the other hand, according to the wireless communication device 100 of the present embodiment, it is confirmed whether or not the transmission is possible according to the transmission power, and thus it is possible to more reliably prevent communication collision when the wireless communication devices have different transmission powers. Therefore, it is possible to suppress the decrease in the communication efficiency in a situation in which a plurality of wireless communication devices having different transmission powers are mixed. Particularly, when the transmission power is variable, it is possible to increase the certainty of preventing communication collision while increasing the space utilization rate of wireless communication resources.

Further, the wireless communication device 100 transmits the first signal when the parameter related to the transmission power is a threshold value or more. Therefore, since the first signal is transmitted only when the transmission power is a predetermined degree or more, it is possible to suppress the excessive increase in the transmission frequency of the first signal. Therefore, by optimizing the transmission frequency of the first signal, it is possible to reduce the load on the communication process or the communication resources to be used.

4-4. Modified Example

The second embodiment of the present disclosure has been described above. The present embodiment is not limited to the above example. A modified example of the present embodiment is described below.

As a modified example of the present embodiment, the wireless communication device 100 may perform the transmission control of the first signal on the basis of the parameter related to the transmission power on the premise of correlative control of the transmission power and the detection sensitivity. Specifically, the control unit 130 correlatively changes the parameter related to the transmission power and the parameter related to the detection sensitivity, and controls the transmission of the first signal on the basis of a plurality of threshold values for the parameter related to the transmission power. A process of the present modified example will be described in detail with reference to FIG. 13. FIG. 13 is a flowchart conceptually illustrating an example of a data transmission process of the STA 100 according to the modified example of the present embodiment. Description of processes which are substantially the same as the processes described above will be omitted.

After a process of steps S331 to S333 is performed, when the data length is determined to be less than the threshold value (NO in step S333), the STA 100 acquires the set parameter related to the transmission power (step S334), and determines whether or not the set parameter related to the transmission power is a first threshold value or more (step S335). Specifically, the control unit 130 acquires a threshold value corresponding to the threshold value of the transmission power value used in the second embodiment as the first threshold value, and determines whether or not the set transmission power value is the acquired first threshold value or more.

When the set parameter related to the transmission power is determined to be less than the first threshold value (NO in step S335), the STA 100 determines whether or not the set parameter related to the transmission power is less than a second threshold value (step S336). Specifically, the control unit 130 acquires a threshold value corresponding to the transmission power value set to correspond to the threshold value of the detection sensitivity used in the first embodiment as the second threshold value, and determines whether or not the set transmission power value is less than the acquired second threshold value. This is because the transmission power is generally set to decrease with the decrease in the detection sensitivity and set to increase with the increase in the detection sensitivity.

When the set parameter related to the transmission power is determined to be the first threshold value or more (YES in step S335) or when the set parameter related to the transmission power is determined to be less than the second threshold value (YES in step S336), the STA 100 transmits the RTS frame (step S337). On the other hand, when the set parameter related to the transmission power is determined to be the second threshold value or more (NO in step S336), the STA 100 transmits the data frame without transmitting the RTS frame (step S339).

As described above, according to the modified example of the present embodiment, the change in the parameter related to the transmission power includes the correlative change of the parameter related to the detection sensitivity and the parameter related to the transmission power, and the wireless communication device 100 transmits the first signal on the basis of a plurality of threshold values for the parameter related to the transmission power. Therefore, control corresponding to the transmission control of the first signal based on the parameter related to the detection sensitivity can be performed using only the parameter related to the transmission power. Accordingly, it is possible to reduce the information used for the transmission control of the first signal and the overhead of the control. Instead of the parameter related to the transmission power, the transmission of the first signal may be controlled using a plurality of threshold values for the parameter related to the detection sensitivity.

5. THIRD EMBODIMENT

Next, wireless communication devices 100 and 200 according to a third embodiment of the present disclosure will be described. In the third embodiment, an STA 100 whose detection sensitivity is controlled and an AP 200 that gives a notification indicating information such as the parameter related to the detection sensitivity of the STA 100 will be described.

5-1. Functions of Device

{Functions of STA}
First, functions of the STA 100 according to the present embodiment will be described. Description of functions which are substantially the same as those of the first or second embodiment will be omitted.

(Setting of Threshold Value of Parameter Related to Detection Sensitivity)

The STA 100 sets a threshold value of the parameter related to the detection sensitivity. Specifically, the control unit 130 sets a threshold value of the parameter related to the detection sensitivity obtained from another wireless communication device as the threshold value of the STA 100. For example, the wireless communication unit 120 receives a threshold value notification frame (which will be described later) transmitted from the AP 200, and the data processing unit 110 acquires a threshold value of the signal detection level from the threshold value notification frame. Then, the control unit 130 sets the acquired threshold value as the threshold value of the signal detection level of the STA 100.

(Acquisition of Parameter Related to Detection Sensitivity of Neighboring Device)

The STA 100 acquires a parameter related to detection sensitivity of another wireless communication device. Specifically, the control unit 130 acquires a parameter related to detection sensitivity received from another wireless communication device (hereinafter, also referred to as a "received parameter related to detection sensitivity"). For example, the wireless communication unit 120 receives a signal in which the parameter related to the detection sensitivity transmitted from the AP 200 is stored. Then, the data processing unit 110 acquires the parameter related to the detection sensitivity from the received signal, and provides the acquired parameter to the control unit 130.

(Transmission Control of RTS)

The STA 100 controls the transmission of the first signal on the basis of the parameter related to the detection sensitivity of another STA 100 obtained via communication. Specifically, the control unit 130 controls the transmission of the RTS frame on the basis of the signal or energy detection level set in another STA 100, which is received from the AP 200. For example, when the received signal detection level of another STA 100 is less than a predetermined threshold value, the control unit 130 decides that the RTS frame is transmitted.

(Transmission of Parameter Related to Detection Sensitivity)

The STA 100 notifies other wireless communication devices of the parameter related to the detection sensitivity which is set therein. Specifically, the control unit 130 controls transmission of a signal having information specifying the parameter related to the detection sensitivity set in the STA 100. For example, the control unit 130 causes the data processing unit 110 to periodically generate a frame in which the parameter related to the detection sensitivity is stored and that is addressed to the AP 200 (hereinafter, also referred to as a "parameter notification frame"). Then, the wireless communication unit 120 transmits the generated parameter notification frame. The parameter notification frame may be addressed to another STA 100.

{Functions of AP}
Next, functions of the AP 200 according to the present embodiment will be described.

(Collection of Parameters Related to Detection Sensitivity)

The AP 200 collects the parameters related to the detection sensitivity of other wireless communication devices. Specifically, the data processing unit 210 causes the storage unit 240 to store the parameter related to the detection sensitivity acquired from the signal received through the wireless communication unit 220. For example, the wireless communication unit 220 receives the parameter notification frame received from the STA 100. The data processing unit 210 acquires the parameter related to the detection sensitivity from the received parameter notification frame and stores the acquired parameter in the storage unit 240.

(Transmission of Parameter Related to Detection Sensitivity)

The AP 200 notifies the STA 100 of the collected parameters related to the detection sensitivity. Specifically, the control unit 230 controls transmission of a frame having the parameter related to the detection sensitivity stored in the storage unit 240 (hereinafter, also referred to as a "parameter distribution frame"). For example, the control unit 230 causes the data processing unit 210 to periodically generate the parameter distribution frame having the parameter related to the detection sensitivity stored in the storage unit 240. Then, the wireless communication unit 220 transmits the generated parameter distribution frame.

(Transmission of Threshold Value of Parameter Related to Detection Sensitivity)

The AP 200 notifies the STA 100 of the threshold value of the parameter related to the detection sensitivity. Specifically, the control unit 230 controls transmission of a frame having information specifying a threshold value of each parameter related to the detection sensitivity to be set in each STA 100 (hereinafter, also referred to as a "threshold value notification frame"). For example, the control unit 230 causes the data processing unit 210 to periodically generate the threshold value notification frame having each of pieces of information specifying the parameters related to the detection sensitivity to be set in each STA 100. Then, the wireless communication unit 220 transmits the generated threshold value notification frame. As the threshold value notification frame, there is a management frame such as a beacon or a data frame.

5-2. Flow of Process (Data Transmission Process)

Next, a data transmission process of the STA 100 will be described with reference to FIG. 14. FIG. 14 is a flowchart conceptually illustrating an example of a data transmission process of the STA 100 according to the third embodiment of the present disclosure. Description of processes which are substantially the same as the processes described above will be omitted.

After a process of steps S341 to S343 is performed, when the data length is determined to be less than the threshold value (NO in step S343), the STA 100 determines whether or not or not the parameter related to the detection sensitivity is received from another wireless communication device (step S344). Specifically, the control unit 130 determines whether or not the parameter distribution frame is received from the AP 200, and the signal detection level of another neighboring STA 100 is acquired.

When the parameter related to the detection sensitivity is determined to be received from another wireless communication device (YES in step S344), the STA 100 determines whether or not the received parameter related to the detection sensitivity is less than a threshold value (step S345). Specifically, when the signal detection level of another STA 100 is determined to be acquired, the control unit 130 determines whether or not the acquired signal detection level is less than a threshold value.

When the received parameter related to the detection sensitivity is determined to be less than the threshold value (YES in step S345), the STA 100 transmits the RTS frame (step S346). On the other hand, when the parameter related to the detection sensitivity is determined not to be received (NO in step S344) or when the received parameter related to the detection sensitivity is determined to be less than the threshold value (NO in step S345), the STA 100 transmits the data frame without transmitting the RTS frame (step S348).

(Parameter-Related Process of STA)

Next, a parameter-related process of the STA 100 will be described with reference to FIG. 15. FIG. 15 is a flowchart conceptually illustrating an example of a parameter-related process of the STA 100 according to the present embodiment.

When a transmission time of parameter notification frame is determined to have arrived (YES in step S401), the STA 100 transmits the parameter notification frame (step S402). Specifically, when the transmission time of the parameter notification frame which arrives periodically has arrived, the control unit 130 causes the data processing unit 110 to generate the parameter notification frame having the parameter related to the detection sensitivity set in the STA 100. Then, the wireless communication unit 120 transmits the generated parameter notification frame.

Then, the STA 100 determines whether or not the parameter distribution frame is received from another wireless communication device (step S403). More specifically, the data processing unit 110 determines whether or not the parameter distribution frame is received from the AP 200 through the wireless communication unit 120.

When the parameter distribution frame is determined to be received from another wireless communication device (YES in step S403), the STA 100 stores the received parameter (step S404). Specifically, the data processing unit 110 acquires the parameter related to the detection sensitivity from the parameter distribution frame received through the wireless communication unit 120, and stores the acquired parameter related to the detection sensitivity in the storage unit 140.

Then, the STA 100 determines whether or not the threshold value notification frame is received from another wireless communication device (step S405). More specifically, the data processing unit 110 determines whether or not the threshold value notification frame transmitted from the AP 200 is received through the wireless communication unit 120.

When the threshold value notification frame is determined to be received from another wireless communication device (YES in step S405), the STA 100 sets a threshold value (step S406). Specifically, the data processing unit 110 acquires the threshold value of the parameter related to the detection sensitivity from the threshold value notification frame received through the wireless communication unit 120, and the control unit 130 sets the acquired threshold value as the threshold value of the parameter related to the detection sensitivity of the STA 100.

(Parameter-Related Process of AP)

Next, a parameter-related process of AP 200 will be described with reference to FIG. 16. FIG. 16 is a flowchart conceptually illustrating an example of a parameter-related process of the AP 200 according to the present embodiment.

The AP 200 determines whether or not the parameter notification frame is received from another wireless communication device (step S501). More specifically, the data processing unit 210 determines whether or not the parameter notification frame is received from the STA 100 through the wireless communication unit 220.

When the parameter notification frame is determined to be received from another wireless communication device (YES in step S501), the AP 200 stores the received parameter (step S502). Specifically, the data processing unit 210 acquires the parameter related to the detection sensitivity from the received parameter notification frame, and stores the acquired parameter related to the detection sensitivity in the storage unit 240.

Then, the AP 200 determines whether or not the transmission time of the parameter distribution frame has arrived (step S503). Specifically, the control unit 230 determines whether or not the transmission time of the parameter distribution frame that arrives periodically has arrived.

When the transmission time of the parameter distribution frame is determined to have arrived (YES in step S503), the AP 200 determines whether or not at least one received parameter is stored (step S504). Specifically, the control unit 230 determines whether or not at least one received parameter related to the detection sensitivity is stored in the storage unit 240.

When at least one received parameter is determined to be stored (YES in step S504), the AP 200 transmits the parameter distribution frame (step S505). Specifically, the control unit 230 causes the data processing unit 210 to generate the parameter distribution frame having the stored received parameter related to the detection sensitivity. Then, the wireless communication unit 220 transmits the generated parameter distribution frame.

Then, the AP 200 determines whether or not the transmission time of the threshold value notification frame has arrived (step S506). Specifically, the control unit 230 determines whether or not the transmission time of the threshold value notification frame that arrives periodically has arrived.

When the transmission time of the threshold value notification frame is determined to have arrived (YES in step S506), the AP 200 transmits the threshold value notification frame (step S507). Specifically, the control unit 230 causes the data processing unit 210 to generate the threshold value notification frame in which each threshold value to be set in each STA 100 is stored. Then, the wireless communication unit 220 transmits the generated threshold value notification frame.

In the above example, the parameter distribution frame and the threshold value notification frame have been described as being different frames, but they may be the same frame.

5-3. Conclusion of Third Embodiment

Thus, according to the third embodiment of the present disclosure, the parameters related to the detection sensitivity include the parameters received from other wireless communication devices different from the wireless communication device 100. Here, even when the detection sensitivity of the wireless communication device 100 is not changed, if the detection sensitivity of another wireless communication device is changed, a relative relation of the detection sensitivity between the wireless communication devices changes. In this regard, by controlling the transmission of the first signal according to the parameter related to the detection sensitivity received from another wireless communication device, it is possible to adapt the transmission control of the first signal to the change in the relative relation of the detection sensitivity. Therefore, communication collision can be more easily prevented.

Further, the wireless communication device 100 transmits the first signal when the parameter related to the detection sensitivity received from another wireless communication device is less than a threshold value. Therefore, it is possible to cause the first signal to be transmitted only when the detection sensitivity of another wireless communication device is a predetermined degree or more, that is, when there is a possibility that the detection sensitivity of the wireless communication device 100 is relatively lower than that of another wireless communication device by a certain degree. Accordingly, it is possible to suppress the excessive increase in the transmission frequency of the first signal.

Further, the wireless communication device 100 transmits a signal having information specifying the parameter related to the detection sensitivity set in the wireless communication device 100. Therefore, it is possible to give the notification indicating the parameter related to the detection sensitivity of the wireless communication device 100 to other neighboring wireless communication devices. Accordingly, it is possible to cause other wireless communication devices to operate similarly to the wireless communication device 100, that is, to cause the first signal to be transmitted on the basis of the parameter related to the detection sensitivity of the wireless communication device 100.

The threshold value of the parameter for the transmission of the first signal includes the threshold value received from another wireless communication device different from the wireless communication device 100. Therefore, it is possible to control the transmission of the first signal through the device (for example, the AP 200) that transmits the threshold value of the parameter. Accordingly, it is possible to optimize the detection sensitivity according to the wireless communication environment and improve the utilization efficiency of the communication resources.

5-4. Modified Example

The third embodiment of the present disclosure has been described above. The present embodiment is not limited to the above example. A modified example of the present embodiment will be described below.

As a modified example of the present embodiment, the wireless communication device 100 may control the transmission of the first signal on the basis of its own detection sensitivity and the detection sensitivity of another wireless communication device. Specifically, the control unit 130 controls the transmission of the first signal on the basis of the parameter related to the detection sensitivity set in the wireless communication device 100 and the parameter related to the detection sensitivity received from another wireless communication device different from the wireless communication device 100. For example, the control unit 130 transmits the first signal when a difference between the parameter related to the detection sensitivity set in the wireless communication device 100 and the parameter related to the detection sensitivity received from another wireless communication device is a threshold value or more. Further, a process of the present modified example will be described with reference to FIG. 17. FIG. 17 is a flowchart conceptually illustrating an example of a data transmission process of the STA 100 according to the modified example of the present embodiment. Description of processes which are substantially the same as the processes described above will be omitted.

After a process of steps S351 to S353 is performed, when the data length is determined to be less than the threshold value (NO in step S353), the STA 100 determines whether or not the parameter related to the detection sensitivity is received from another STA (step S354).

When the parameter related to the detection sensitivity is determined to be received from another STA (YES in step S354), the STA 100 acquires the difference between the set parameter and the received parameter (step S355). Specifically, the control unit 130 calculates the difference between the signal detection level received from another wireless communication device and the signal detection level set in the STA 100.

Then, the STA 100 determines whether or not the obtained difference is a threshold value or more (step S356). Specifically, the control unit 130 determines whether or not the difference of the calculated signal detection level is a threshold value or more.

When the parameter related to the detection sensitivity is determined not to be received from another STA (NO in step S354) or when the acquired difference is determined to be less than the threshold value (NO in step S356), the STA 100 determines whether or not the set parameter related to the detection sensitivity is a threshold value or more (step S357). More specifically, when the difference in the calculated signal detection level is less than the threshold value, the control unit 130 further determines whether or not the signal detection level of the STA 100 is a threshold value or more.

When the acquired difference is determined to be a threshold value or more (YES in step S356) or when the set parameter related to the detection sensitivity is determined to be a threshold value or more (YES in step S357), the STA 100 transmits the RTS frame (step S358). On the other hand, when the set parameter related to the detection sensitivity is determined to be less than the threshold value (NO in step S357), the STA 100 transmits the data frame without transmitting the RTS frame (step S360).

As described above, according to the modified example of the present embodiment, the wireless communication device 100 transmits the first signal on the basis of the parameter related to the detection sensitivity set in the wireless communication device 100 and the parameter related to the detection sensitivity received from another wireless communication device different from the wireless communication device 100. Therefore, even when at least one of the parameters related to the detection sensitivity of the wireless communication device 100 and another wireless communication device changes, it is possible to detect the change in the relative relation of the detection sensitivity. Accordingly, it is possible to more accurately adapt the transmission control of the first signal to the change in the relative relation of the detection sensitivity.

The wireless communication device 100 transmits the first signal when the difference between the parameter related to the detection sensitivity set in the wireless communication device 100 and the parameter related to the detection sensitivity received from another wireless communication device is a threshold value or more. Therefore, it is possible to cause the first signal to be transmitted only when a difference of a predetermined degree or more occurs in the detection sensitivity. Accordingly, it is possible to optimize the transmission frequency of the first signal.

6. FOURTH EMBODIMENT

Next, wireless communication devices 100 and 200 according to a fourth embodiment of the present disclosure will be described. In the fourth embodiment, an STA 100 whose transmission power is controlled and an AP 200 that gives a notification indicating information such as the parameters related to the transmission power of another STA 100 will be described.

6-1. Functions of Device

{Functions of STA}

First, functions of the STA 100 according to the present embodiment will be described. Description of functions which are substantially the same as the functions of the first to third embodiments will be omitted.

(Setting of Threshold Value of Parameter Related to Transmission Power)

The STA 100 sets the threshold value of the parameter related to the transmission power. Specifically, the control unit 130 sets the threshold value of the parameter related to the transmission power obtained from another wireless communication device as the threshold value of the STA 100. For example, the data processing unit 110 acquires the threshold value of the transmission power from the threshold value notification frame received through the wireless communication unit 120. Then, the control unit 130 sets the acquired threshold value as the threshold value of the transmission power of the STA 100.

(Acquisition of Parameter Related to Transmission Power of Neighboring Device)

The STA 100 acquires the parameter related to the transmission power of another wireless communication device. Specifically, the control unit 130 acquires the parameter related to transmission power received from another wireless communication device (hereinafter, also referred to as a "transmission power received parameter"). For example, the data processing unit 110 acquires the parameter related to the transmission power from the parameter distribution frame received through the wireless communication unit 120, and provides the acquired parameter to the control unit 130.

(Transmission Control of RTS)

The STA 100 controls the transmission of the first signal on the basis of the parameter related to the transmission power of another STA 100 obtained via communication. Specifically, the control unit 130 controls the transmission of the RTS frame on the basis of the parameter related to the transmission power set in another STA 100 received from the AP 200 (hereinafter, also referred to as a "received parameter related to transmission power"). For example, when the received transmission power value of another STA 100 is less than a predetermined threshold value, the control unit 130 decides that the RTS frame is transmitted.

(Transmission of Parameter Related to Transmission Power)

The STA 100 notifies another wireless communication device of the parameter related to the transmission power which is set therein. Specifically, the control unit 130 controls transmission of a signal having information specifying the parameter related to the transmission power set in the STA 100. For example, the control unit 130 causes the data processing unit 110 to periodically generate the parameter notification frame in which a parameter related to the transmission power is stored and that is addressed to the AP 200. Then, the wireless communication unit 120 transmits the generated parameter notification frame.

{Functions of AP}

Since the functions of the AP 200 according to the present embodiment are substantially the same as the functions of the AP 200 according to the third embodiment when the detection sensitivity is replaced with the transmission power, description thereof will be omitted.

6-2. Flow of Process

Next, a data transmission process of the STA 100 will be described with reference to FIG. 18. FIG. 18 is a flowchart conceptually illustrating an example of a data transmission process of the STA 100 according to the fourth embodiment of the present disclosure. Description of processes which are substantially the same as the processes described above will be omitted.

After a process of steps S361 to S363 is performed, when the data length is determined to be less than the threshold value (NO in step S363), the STA 100 determines whether or not the parameter related to the transmission power is received from another wireless communication device (step S364). Specifically, the control unit 130 determines whether or not the parameter distribution frame is received from the AP 200, and the transmission power value of another neighboring STA 100 is acquired.

When the parameter related to the transmission power is determined to be received from another wireless communication device (YES in step S364), the STA 100 determines whether or not the received parameter related to the transmission power is less than a threshold value (step S365). Specifically, when the transmission power value of another STA 100 is determined to be acquired, the control unit 130 determines whether or not the acquired transmission power value is less than a threshold value.

When the received parameter related to the transmission power is determined to be less than the threshold value (YES in step S365), the STA 100 transmits the RTS frame (step S366). On the other hand, when the parameter related to the transmission power is determined not to be received (NO in step S364) or when the received parameter related to the transmission power is determined to be the threshold value or more (NO in step S365), the STA 100 transmits the data frame without transmitting the RTS frame (step S368).

6-3. Conclusion of Fourth Embodiment

As described above, according to the fourth embodiment of the present disclosure, the parameters related to the transmission power include the parameter received from another wireless communication device different from the wireless communication device 100. Similarly to the case of the detection sensitivity, when the transmission power of another wireless communication device is changed, the relative relation of the transmission power between the wireless communication devices may change. Therefore, by controlling the transmission of the first signal according to the parameter related to the transmission power received from another wireless communication device, it is possible to adapt the transmission control of the first signal to the change in the relative relation of the transmission power. Accordingly, communication collision can be more easily prevented.

Further, the wireless communication device 100 transmits the first signal when the parameter related to the transmission power received from another wireless communication device is less than the threshold value. Therefore, it is possible to cause the first signal to be transmitted only when the transmission power of another wireless communication device is less than a predetermined degree, that is, when there is a possibility that the transmission power of the wireless communication device 100 is relatively higher than that of another wireless communication device by a predetermined degree. Accordingly, it is possible to suppress the excessive increase in the transmission frequency of the first signal.

6-4. Modified Example

The fourth embodiment of the present disclosure has been described above. The present embodiment is not limited to the above example. A modified example of the present embodiment will be described below.

As a modified example of the present embodiment, the wireless communication device 100 may control the transmission of the first signal on the basis of its own transmission power and the transmission power of another wireless communication device. Specifically, when the difference between the parameter related to the transmission power set in the wireless communication device 100 and the parameter related to the transmission power received from another wireless communication device is a threshold value or more, the control unit 130 transmits the first signal. Further, a process of the present modified example will be described with reference to FIG. 19. FIG. 19 is a flowchart conceptually illustrating an example of a data transmission process of the STA 100 according to the modified example of the present embodiment. Description of processes which are substantially the same as the processes described above will be omitted.

After a process of steps S371 to S373 is performed, when the data length is determined to be less than the threshold value (NO in step S373), the STA 100 determines whether or not the parameter related to the transmission power is received from another STA (step S374).

When the parameter related to the transmission power is determined to be received from another STA (YES in step S374), the STA 100 acquires the difference between the set parameter and the received parameter (step S375). Specifically, the control unit 130 calculates the difference between the transmission power value received from another wireless communication device and the transmission power value set in the STA 100.

Then, the STA 100 determines whether or not the acquired difference is a threshold value or more (step S376). Specifically, the control unit 130 determines whether or not the difference between the calculated transmission power values is a threshold value or more.

When the parameter related to the transmission power is determined not to be received from another STA (NO in step S374) or when the acquired difference is determined to be less than the threshold value (NO in step S376), the STA 100 determines whether or not the set parameter related to the transmission power is a threshold value or more (step S377). Specifically, when the difference of the calculated transmission power values is less than the threshold value, the control unit 130 further determines whether or not the transmission power value of the STA 100 is a threshold value or more.

When the acquired difference is determined to be a threshold value or more (YES in step S376) or when the set parameter related to the transmission power is determined to be the threshold value or more (YES in step S377), the STA 100 transmits the RTS frame (step S378). On the other hand, when the set parameter related to the transmission power is determined to be less than the threshold value (NO in step S377), the STA 100 transmits the data frame without transmitting the RTS frame (step S380).

As described above, according to the modified example of the present embodiment, the wireless communication device 100 transmits the first signal on the basis of the parameter related to the transmission power set in the wireless communication device 100 and the parameter related to the transmission power received from another wireless communication device different from the wireless communication device 100. Therefore, even when at least one of the parameters related to the transmission power of the wireless communication device 100 and another wireless communication device changes, it is possible to detect the change in the relative relation of the transmission power. Accordingly, it is possible to more accurately adapt the transmission control of the first signal to the change in the relative relation of the transmission power.

Further, the wireless communication device 100 transmits the first signal when the difference between the parameter related to the transmission power set in the wireless communication device 100 and the parameter related to the transmission power received from another wireless communication device is a threshold value or more. Therefore, it is possible to cause the first signal to be transmitted only when a difference of a predetermined degree or more occurs in the transmission power. Accordingly, it is possible to optimize the transmission frequency of the first signal.

7. APPLICATION EXAMPLES

The technology according to the present disclosure can be applied to various products. For example, the wireless communication device 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. Further, the wireless communication device 100 may be realized as terminals (also referred to as machine type communication (MTC) terminals) which perform machine to machine (M2M) communication, such as smart meters, vending machine, remote monitoring devices and point of sale (POS) terminals. Furthermore, the wireless communication device 100 may be wireless communication modules mounted in such terminals (for example, integrated circuit modules configured in one die).

For example, the wireless communication device 200 may be realized as a wireless LAN access point (which is also referred to as a wireless base station) that has no router function or has a router function. The wireless communication device 200 may be realized as a mobile wireless LAN router. Furthermore, the wireless communication device 200 may be wireless communication modules mounted in such devices (for example, integrated circuit modules configured in one die).

7-1. First Application Example

FIG. 20 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct (registered trademark), or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 20. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 20 via power supply lines partially indicated by dashed lines in the drawing. The auxiliary controller 919 causes, for example, minimum functions of the smartphone 900 to be operated in a sleep mode.

In the smartphone 900 illustrated in FIG. 20, the data processing unit 110, the wireless communication unit 120 and the control unit 130 described with reference to FIG. 8 may be implemented in the wireless communication interface 913. Further, at least some of the functions may be implemented in the processor 901 or the auxiliary controller 919. For example, the control unit 130 transmits the first signal to the data processing unit 110 and the wireless communication unit 120 on the basis of the parameter related to the detection sensitivity or the transmission power. As a result, since it is confirmed whether or not transmission is possible according to the detection sensitivity or the transmission power, it is possible to more reliably prevent communication collision when the smartphone 900 and another wireless communication device differ in the detection sensitivity or the transmission power. Therefore, it is possible to suppress the decrease in the communication efficiency in a situation in which a plurality of wireless communication devices having different detection sensitivities or transmission powers are mixed.

The smartphone 900 may operate as a wireless access point (software AP) when the processor 901 performs an access point function at an application level. The wireless communication interface 913 may have the wireless access point function.

7-2. Second Application Example

FIG. 21 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 21. In this case, the antenna switch 934 may be omitted from the configuration of the car navigation apparatus 920.

The battery 938 supplies electric power to each of the blocks of the car navigation apparatus 920 shown in FIG. 21 via power supply lines partially indicated by dashed lines in the drawing. In addition, the battery 938 accumulates electric power supplied from the vehicle.

In the car navigation apparatus 920 illustrated in FIG. 21, the data processing unit 110, the wireless communication unit 120, and the control unit 130 described above with reference to FIG. 8 may be implemented in the wireless communication interface 933. Further, at least some of the functions may be implemented in the processor 921. For example, the control unit 130 transmits the first signal to the data processing unit 110 and the wireless communication unit 120 on the basis of the parameter related to the detection sensitivity or the transmission power. As a result, since it is confirmed whether or not transmission is possible according to the detection sensitivity or the transmission power, it is possible to more reliably prevent communication collision when the car navigation apparatus 920 and another wireless communication device differ in the detection sensitivity or the transmission power. Therefore, it is possible to suppress the decrease in the communication efficiency in a situation in which a plurality of wireless communication devices having different detection sensitivities or transmission powers are mixed.

Further, the wireless communication interface 933 may operate as the wireless communication device 200 and provide a wireless connection to a terminal owned by the user riding in the vehicle. At this time, for example, the wireless communication device 200 sets the parameter related to the detection sensitivity or the transmission power for the terminal owned by the user, and controls the transmission of the first signal on the basis of the set parameter. As a result, when a plurality of terminals owned by the user are mixed, it is possible to more reliably prevent communication collision even when the terminals differ in the detection sensitivity or the transmission power. Therefore, it is possible to suppress the decrease in the communication efficiency in a situation in which a plurality of wireless communication devices having different detection sensitivities or transmission powers are mixed.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

7-3. Third Application Example

FIG. 22 is a block diagram showing an example of a schematic configuration of a wireless access point 950 to which a technology related to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single or a plurality of antenna elements and is used for transmission and reception of wireless signals from the wireless communication interface 963.

In the wireless access point 950 illustrated in FIG. 22, the data processing unit 210, the wireless communication unit 220, and the control unit 230 described above with reference to FIG. 8 may be implemented in the wireless communication interface 963. At least some of the functions may be implemented in the controller 951. For example, the control unit 230 sets the parameter related to the detection sensitivity or the transmission power for the terminal owned by the user, and controls the transmission of the first signal using the data processing unit 210 and the wireless communication unit 220 on the basis of the set parameter. As a result, when a plurality of terminals connected to the wireless access point 950 are mixed, it is possible to more reliably prevent communication collision even when the terminals differ in the detection sensitivity or the transmission power. Therefore, it is possible to suppress the decrease in the communication efficiency in a situation in which a plurality of wireless communication devices having different detection sensitivities or transmission powers are mixed.

8. CONCLUSION

As described above, according to the first embodiment of the present disclosure, since it is confirmed whether or not transmission is possible according to the detection sensitivity, it is possible to more reliably prevent communication collision when the wireless communication devices differ in the detection sensitivity. Therefore, it is possible to suppress the decrease in the communication efficiency in a situation in which a plurality of wireless communication devices having different detection sensitivities are mixed. Particularly, when the detection sensitivity is variable, it is possible to increase the certainty of preventing communication collision while increasing the space utilization rate of wireless communication resources.

Further, according to the second embodiment of the present disclosure, since it is confirmed whether or not transmission is possible according to the transmission power, it is possible to more reliably prevent communication collision when the wireless communication devices differ in the transmission power. Therefore, it is possible to suppress the decrease in the communication efficiency in a situation in which a plurality of wireless communication devices having different transmission powers are mixed. Particularly, when the transmission power is variable, it is possible to increase the certainty of preventing communication collision while increasing the space utilization rate of wireless communication resources.

According to the third embodiment of the present disclosure, the transmission of the first signal is controlled according to the parameter related to the detection sensitivity received from another wireless communication device, and thus it is possible to adapt the transmission control of the first signal to the change in the relative relation of the detection sensitivity. Therefore, communication collision can be more easily prevented.

According to the fourth embodiment of the present disclosure, the transmission of the first signal is controlled according to the parameter related to the transmission power received from another wireless communication device, and thus it is possible to adapt the transmission control of the first signal to the change in the relative relation of the transmission power. Therefore, communication collision can be more easily prevented.

It should be understood by those skilled in the art that various modifications, combinations, sub-combinations and alterations may occur depending on design requirements and other factors insofar as they are within the scope of the appended claims or the equivalents thereof.

For example, in the above embodiments, the notification indicating the parameter related to the transmission power is given from the AP 200, but the present technology is not limited to this example. For example, the parameter related to the transmission power may be detected from a signal transmitted from another STA 100. For example, the STA 100 receives a frame including a header in which the parameter related to the transmission power is stored (for example, a physical layer (PHY) header), and acquires the parameter related to the transmission power from the received frame.

Further, the wireless communication device 100 may perform the transmission control of the first signal based on the above parameters according to the density of surrounding devices. For example, when there are a predetermined number of other wireless communication devices around the wireless communication device 100, the wireless communication device 100 turns on the transmission control of the RTS frame based on the parameter related to the detection sensitivity or the transmission power. This is because the effect of the transmission control of the first signal based on the parameter increases as the number of surrounding devices increases. For example, the effect is promoted in a stadium or the like in which there are many people having the wireless communication device 100.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Further, the steps illustrated in the flowcharts of the above embodiments include not only processes which are performed chronologically in the described order but also processes which are performed not necessarily chronologically but in parallel or individually. Further, it will be appreciated that even when the steps are chronologically processed, an order may be appropriately changed depending on circumstances.

Further, it is also possible to create a computer program causing hardware installed in the wireless communication devices 100 and 200 to perform functions equivalent to those of the functional configurations of the wireless communication devices 100 and 200. Furthermore, a storage medium including the computer program stored therein is also provided.

Additionally, the present technology may also be configured as below.

(1)

A wireless communication device, including:

an acquiring unit configured to acquire a parameter related to detection sensitivity or transmission power; and a transmitting unit configured to transmit a first signal related to confirmation of whether or not transmission is possible on the basis of the acquired parameter.

(2)

The wireless communication device according to (1), wherein the parameter includes the parameter set in the wireless communication device.

(3)

The wireless communication device according to (2), wherein the transmitting unit transmits the first signal when the parameter related to the detection sensitivity is a threshold value or more.

(4)

The wireless communication device according to (2) or (3), wherein the transmitting unit transmits the first signal when the parameter related to the transmission power is a threshold value or more.

(5)

The wireless communication device according to any one of (1) to (4), wherein the parameter includes the parameter received from another wireless communication device different from the wireless communication device.

(6)

The wireless communication device according to (5), wherein the transmitting unit transmits the first signal when the parameter related to the detection sensitivity received from the other wireless communication device is less than a threshold value.

(7)

The wireless communication device according to (5) or (6), wherein the transmitting unit transmits the first signal when the parameter related to the transmission power received from the other wireless communication device is less than a threshold value.

(8)

The wireless communication device according to any one of (1) to (7), wherein the transmitting unit transmits the first signal on the basis of the parameter set in the wireless communication device and the parameter received from another wireless communication device different from the wireless communication device.

(9)

The wireless communication device according to (8), wherein the transmitting unit transmits the first signal when a difference between the parameter related to the detection sensitivity set in the wireless communication device and the parameter related to the detection sensitivity received from the other wireless communication device is a threshold value or more.

(10)

The wireless communication device according to (8) or (9), wherein the transmitting unit transmits the first signal when a difference between the parameter related to the transmission power set in the wireless communication device and the parameter related to the transmission power received from the other wireless communication device is a threshold value or more.

(11)

The wireless communication device according to any one of (5) to (10), wherein the transmitting unit transmits a signal including information specifying the parameter set in the wireless communication device.

(12)

The wireless communication device according to any one of (2) to (11), wherein a threshold value of the parameter for transmission of the first signal includes a threshold value received from another wireless communication device different from the wireless communication device.

(13)

The wireless communication device according to any one of (1) to (12), wherein the transmitting unit transmits the first signal on the basis of a change in the parameter.

(14)

The wireless communication device according to any one of (1) to (13), wherein a change in the parameter includes a correlative change of the parameter related to the detection sensitivity and the parameter related to the transmission power, and the transmitting unit transmits the first signal on the basis of a plurality of threshold values for the parameter related to the detection sensitivity or the parameter related to the transmission power.

(15)

The wireless communication device according to any one of (1) to (14), wherein the parameter related to the detection sensitivity includes at least one of a signal detection threshold value and an energy detection threshold value.

(16)

The wireless communication device according to any one of (1) to (15), wherein the first signal includes a request to send (RTS) frame.

(17)

The wireless communication device according to (16), wherein the transmitting unit transmits the RTS frame on the basis of a length of data to be transmitted and the parameter.

(18)
A wireless communication method, including:
acquiring, by a processor, a parameter related to detection sensitivity or transmission power; and
transmitting, by the processor, a first signal related to confirmation of whether or not transmission is possible on the basis of the acquired parameter.

(19)
An electronic device including:
circuitry configured to
determine a first parameter corresponding to a length or duration of data to be transmitted by the electronic device;
determine whether the first parameter exceeds a predetermined threshold value;
control a wireless interface of the electronic device to transmit a request to send the data when the parameter exceeds the predetermined threshold value;
acquire a second parameter related to detection sensitivity or transmission power; and
determine, when the first parameter does not exceed the predetermined threshold value, whether to transmit the request to send the data prior to transmitting the data based on the second parameter.

(20)
The electronic device of (19), wherein
the circuitry is configured to acquire the second parameter when the first parameter does not exceed the predetermined threshold value.

(21)
The electronic device of any one of (19) to (20), wherein
the first parameter corresponds to the length of data to be transmitted by the electronic device.

(22)
The electronic device of any one of (19) to (21), wherein
the second parameter relates to signal detection sensitivity of the electronic device.

(23)
The electronic device of (22), wherein
the circuitry is configured to control the wireless interface to transmit the request to send the data when the second parameter exceeds a second predetermined threshold value.

(24)
The electronic device of any one of (21) to (22), wherein
the circuitry is configured to control the wireless interface to transmit the data without transmitting the request to send the data when the second parameter is less than a second predetermined threshold value.

(25)
The electronic device of any one of (19) to (23), wherein
the circuitry is configured to transmit the data after receiving a Clear to Send (CTS) when it is determined to transmit the request to send prior to transmitting the data.

(26)
The electronic device of any one of (19) to (25), wherein
the second parameter relates to a change in signal detection sensitivity of the electronic device.

(27)
The electronic device of (26), wherein
the circuitry is configured to control the wireless interface to transmit the request to send the data when the second parameter indicates that the signal detection sensitivity of the electronic device has decreased.

(28)
The electronic device of any one of (26) to (27), wherein
the circuitry is configured to control the wireless interface to transmit the request to send the data when the second parameter indicates that the signal detection sensitivity of the electronic device has decreased below a second predetermined threshold value.

(29)
The electronic device of any one of (26), wherein
The circuitry is configured to control the wireless interface to transmit the data without transmitting the request to send the data when the second parameter indicates that the detection sensitivity of the electronic device has increased.

(30)
The electronic device of (26), wherein
the circuitry is configured to control the wireless interface to transmit the data without transmitting the request to send the data when the second parameter indicates that the detection sensitivity of the electronic device has increased above a second predetermined threshold value.

(31)
The electronic device of any one of (19) to (25), wherein
the second parameter relates to a signal transmission power of the electronic device.

(32)
The electronic device of (31), wherein
the circuitry is configured to control the wireless interface to transmit the request to send the data when the second parameter exceeds a second predetermined threshold value.

(33)
The electronic device of (31), wherein
The circuitry is configured to control the wireless interface to transmit the data without transmitting the request to send the data when the second parameter is less than a second predetermined threshold value.

(34)
The electronic device of (31), wherein
the circuitry is configured to control the wireless interface to transmit the request to send the data when the second parameter exceeds a second predetermined threshold value.

(35)
The electronic device of (34), wherein
the circuitry is configured to compare the parameter to a third predetermined threshold when it is determined that the parameter is less than the second predetermined threshold.

(36)
The electronic device of (35), wherein
the circuitry is configured to control the wireless interface to transmit the request to send the data when the second parameter is less than the third predetermined threshold value.

(37)
The electronic device of (35), wherein
the circuitry is configured to control the wireless interface to transmit the data without transmitting the request to send the data when the second parameter is greater than the third predetermined threshold value.

(38)
The electronic device of (21), wherein the circuitry is configured to:
determine whether the second parameter has been acquired from another electronic device; and
control the wireless interface to transmit the data without transmitting the request to send the data when it is determined that the second parameter has not been acquired from the another electronic device.

(39)
The electronic device of (21), wherein the circuitry is configured to:
determine whether the second parameter has been acquired from another electronic device;

control, when it determined that the second parameter has been received from the another electronic device, the wireless interface to transmit the request to send the data when the second parameter is less than a second predetermined threshold value; and transmit, when it determined that the second parameter has been received from the another electronic device, the data without transmitting the request to send the data when the second parameter is greater than the second predetermined threshold value.

(40)

The electronic device of (31), wherein the circuitry is configured to:

determine whether the second parameter has been acquired from another electronic device; and control the wireless interface to transmit the data without transmitting the request to send the data when it is determined that the second parameter has not been acquired from the another electronic device.

(41)

The electronic device of (31), wherein the circuitry is configured to:

determine whether the second parameter has been acquired from another electronic device;

control, when it determined that the second parameter has been received from the another electronic device, the wireless interface to transmit the request to send the data when the second parameter is less than a second predetermined threshold value; and transmit, when it determined that the second parameter has been received from the another electronic device, the data without transmitting the request to send the data when the second parameter is greater than the second predetermined threshold value.

(42)

The electronic device of (19), wherein the circuitry is configured to:

receive a signal indicating a signal detection sensitivity threshold from another electronic device via the wireless interface; and set the signal detection sensitivity threshold based on the signal received from the another electronic device indicating the signal detection sensitivity threshold.

(43)

The electronic device of (21), wherein the circuitry is configured to:

determine whether the second parameter has been acquired from another electronic device; and control the wireless interface to transmit the data without transmitting the request to send the data when it is determined that the second parameter has not been acquired from the another electronic device and the second parameter is less than a second predetermined threshold value.

(44)

The electronic device of (21), wherein the circuitry is configured to:

determine whether the second parameter has been acquired from another electronic device; and control the wireless interface to transmit the request to send the data when it is determined that the second parameter has not been acquired from the another electronic device and the second parameter is greater than a second predetermined threshold value.

(45)

The electronic device of (21), wherein the circuitry is configured to:

determine whether the second parameter has been acquired from another electronic device;

calculate a different between a signal detection sensitivity of the electronic device and the second parameters acquired from the another electronic device;

control the wireless interface to transmit the request to send the data when the difference is greater than a second predetermined threshold value.

(46)

The electronic device of (21), wherein the circuitry is configured to:

determine whether the second parameter has been acquired from another electronic device;

calculate a different between a signal detection sensitivity of the electronic device and the second parameters acquired from the another electronic device;

control the wireless interface to transmit the request to send the data when it is determined that the difference is less than a second predetermined threshold value and the signal detection sensitivity of the electronic device is greater than a third predetermined threshold value; and control the wireless interface to transmit the data without transmitting the request to send the data when it is determined that the difference is less than a second predetermined threshold value and the signal detection sensitivity of the electronic device is less than a third predetermined threshold value.

(47)

A method performed by an electronic device, the method including:

identifying that data is awaiting transmission at the electronic device;

determine a first parameter corresponding to a length of data to be transmitted by the electronic device;

determining whether the first parameter exceeds a predetermined threshold value;

wirelessly transmitting a request to send the data when the parameter exceeds the predetermined threshold value;

acquiring a second parameter related to detection sensitivity or transmission power;

determining to transmit the request to send the data prior to transmitting the data based on the second parameter in a case that the first parameter does not exceed the predetermined threshold value.

(48)

An electronic device including:

circuitry configured to determine a first parameter corresponding to a length or duration of data to be transmitted by the electronic device;

determine whether the first parameter exceeds a predetermined threshold value;

control a wireless interface of the electronic device to transmit a request to send the data when the parameter exceeds the predetermined threshold value;

acquire a second parameter related to detection sensitivity or transmission power;

determine, when the first parameter does not exceed the predetermined threshold value, whether to transmit the request to send the data prior to transmitting the data based on the second parameter;

receive, via the wireless interface a request to send from another electronic device;

transmit a clear to send to the another electronic device in response to receiving the request to send from the another electronic device; and receive data from the another electronic device after transmitting the clear to send to the another electronic device.

(49)

An apparatus including:

a buffer configured to store data to be transmitted by the electronic device;

circuitry configured to determine a first parameter corresponding to a length or duration of data stored in the buffer; and a memory configured to store a predetermined threshold value corresponding to the first parameter, wherein the circuitry is configured to acquire the predetermined threshold value corresponding to the first parameter from the memory of the electronic device;

determine whether the first parameter exceeds the predetermined threshold value;

control a wireless interface of the electronic device to transmit a request to send the data when the parameter exceeds the predetermined threshold value;

acquire a second parameter related to detection sensitivity or transmission power; and determine, when the first parameter does not exceed the predetermined threshold value, whether to transmit the request to send the data prior to transmitting the data based on the second parameter.

REFERENCE SIGNS LIST 100, 200 wireless communication device, STA
110, 210 data processing unit
120, 220 wireless communication unit
130, 230 control unit
140, 240 storage unit

The invention claimed is:

1. An electronic device comprising:
   circuitry configured to
      acquire a detection sensitivity parameter;
      compare the detection sensitivity parameter to a predetermined detection sensitivity threshold value;
      control a wireless interface of the electronic device to transmit a request to send frame when the detection sensitivity parameter is greater than or equal to the predetermined detection sensitivity threshold value; and
      control the wireless interface of the electronic device to transmit a data frame without transmitting the request to send frame when the detection sensitivity parameter is less than the predetermined detection sensitivity threshold value.

2. The electronic device of claim 1, wherein the predetermined detection sensitivity threshold value is received from another electronic device different from the electronic device.

3. The electronic device of claim 1, wherein the detection sensitivity parameter is received from another electronic device different from the electronic device.

4. The electronic device of claim 3, wherein the circuitry is further configured to transmit a signal including information specifying the detection sensitivity parameter set in the electronic device.

5. An electronic device comprising:
   circuitry configured to
      acquire a first detection sensitivity parameter, wherein the first detection sensitivity parameter includes a detection sensitivity parameter set in the electronic device;
      acquire a second detection sensitivity parameter, wherein the second detection sensitivity parameter includes a detection sensitivity parameter received from another electronic device different from the electronic device;
      calculate a difference between the second detection sensitivity parameter and the first detection sensitivity parameter;
      compare the difference between the second detection sensitivity parameter and the first detection sensitivity parameter to a predetermined threshold value;
      control a wireless interface of the electronic device to transmit a request to send frame when the difference between the second detection sensitivity parameter and the first detection sensitivity parameter is greater than or equal to the predetermined threshold value; and
      control the wireless interface of the electronic device to transmit a data frame without transmitting the request to send frame when the difference between the second detection sensitivity parameter and the first detection sensitivity parameter is less than the predetermined threshold value.

6. The electronic device of claim 5, wherein the circuitry is further configured to transmit a signal including information specifying the first detection sensitivity parameter set in the electronic device.

7. The electronic device of claim 5, wherein the predetermined threshold value includes a threshold value received from the another electronic device different from the electronic device.

8. A wireless communication method, including:
   acquiring, by a processor, a detection sensitivity parameter;
   comparing, by the processor, the detection sensitivity parameter to a predetermined detection sensitivity threshold value;
   controlling, by the processor, a wireless interface of the electronic device to transmit a request to send frame when the detection sensitivity parameter is greater than or equal to the predetermined detection sensitivity threshold value; and
   controlling, by the processor, the wireless interface of the electronic device to transmit a data frame without transmitting the request to send frame when the detection sensitivity parameter is less than the predetermined detection sensitivity threshold value.

* * * * *